(12) United States Patent
Mevissen et al.

(10) Patent No.: US 9,038,799 B2
(45) Date of Patent: May 26, 2015

(54) DRIVEN COMPONENT WITH CLUTCH FOR SELECTIVE OPERATION OF COMPONENT

(75) Inventors: Pierre A. Mevissen, King City (CA); Jacek Stepniak, Innisfil (CA); Roman Tracz, Mississauga (CA); John Danciu, Maple (CA); Scott Parsons, Toronto (CA)

(73) Assignee: Litens Automotive Partnership, Woodbridge (CA)

( * ) Notice: Subject to any disclaimer, the term of this patent is extended or adjusted under 35 U.S.C. 154(b) by 35 days.

(21) Appl. No.: 13/877,773

(22) PCT Filed: Oct. 4, 2011

(86) PCT No.: PCT/CA2011/001109
§ 371 (c)(1),
(2), (4) Date: Apr. 23, 2013

(87) PCT Pub. No.: WO2012/045151
PCT Pub. Date: Apr. 12, 2012

(65) Prior Publication Data
US 2013/0313068 A1 Nov. 28, 2013

Related U.S. Application Data

(60) Provisional application No. 61/389,452, filed on Oct. 4, 2010, provisional application No. 61/431,006, filed on Jan. 8, 2011, provisional application No. 61/487,327, filed on May 18, 2011.

(51) Int. Cl.
*F16D 27/105* (2006.01)
*F16D 13/08* (2006.01)
*B60K 25/00* (2006.01)
(Continued)

(52) U.S. Cl.
CPC ............ *F16D 13/08* (2013.01); *B60K 25/00* (2013.01); *F01P 5/12* (2013.01); *F16D 27/105* (2013.01); *F16H 55/36* (2013.01)

(58) Field of Classification Search
None
See application file for complete search history.

(56) References Cited

U.S. PATENT DOCUMENTS

| 2,976,976 A | 3/1961 | Parker | |
| 4,825,988 A * | 5/1989 | Nishimura | 192/12 BA |
| 5,031,744 A * | 7/1991 | Nishimura | 192/81 C |

(Continued)

FOREIGN PATENT DOCUMENTS

| EP | 1884678 A1 | 2/2008 |
| WO | WO 2010054487 A1 | 5/2010 |

OTHER PUBLICATIONS

International Search Report, ISA/CA, mailed Dec. 20, 2011 (3 pages) and the International Preliminary Report on Patentability, IPEA/CA, mailed Jul. 25, 2012 (10 pages) for PCT/CA2011/001109.

*Primary Examiner* — Ramya Burgess
*Assistant Examiner* — Mark Manley
(74) *Attorney, Agent, or Firm* — Harness, Dickey & Pierce, P.L.C.

(57) ABSTRACT

A component, such as an engine accessory for an automotive engine, that has clutch with a helical clutch coil and an axially movable armature. The helical clutch coil is normally engaged so as to transmit rotary power between a driving member and a driven member. The armature can be moved to apply a force to a tang of the helical clutch coil that causes the helical clutch coil to disengage to an extent where full rotary power is not passed through the clutch to drive the component.

21 Claims, 22 Drawing Sheets

(51) Int. Cl.
*F01P 5/12* (2006.01)
*F16H 55/36* (2006.01)

(56) References Cited

U.S. PATENT DOCUMENTS 5,099,974 A * 3/1992 Spechko .................. 192/84.81
7,712,592 B2 * 5/2010 Jansen et al. ................. 192/41 S
8,387,767 B2 3/2013 Komorowski et al.
2008/0031749 A1 2/2008 Hoshino et al.
2010/0122882 A1 5/2010 Komorowski et al.
2010/0230227 A1 9/2010 Parsons et al.
2013/0008758 A1 1/2013 Komorowski et al.

* cited by examiner

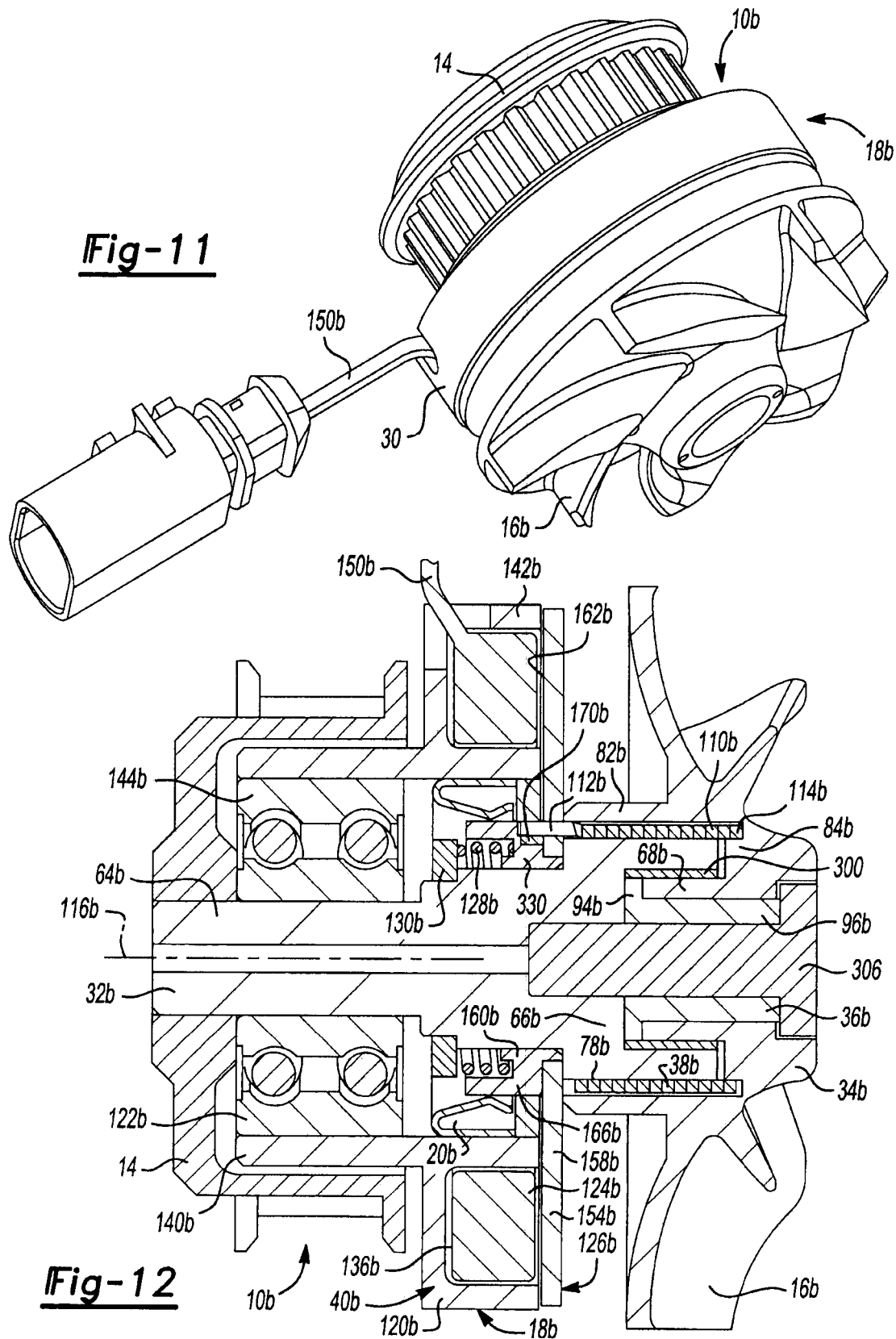

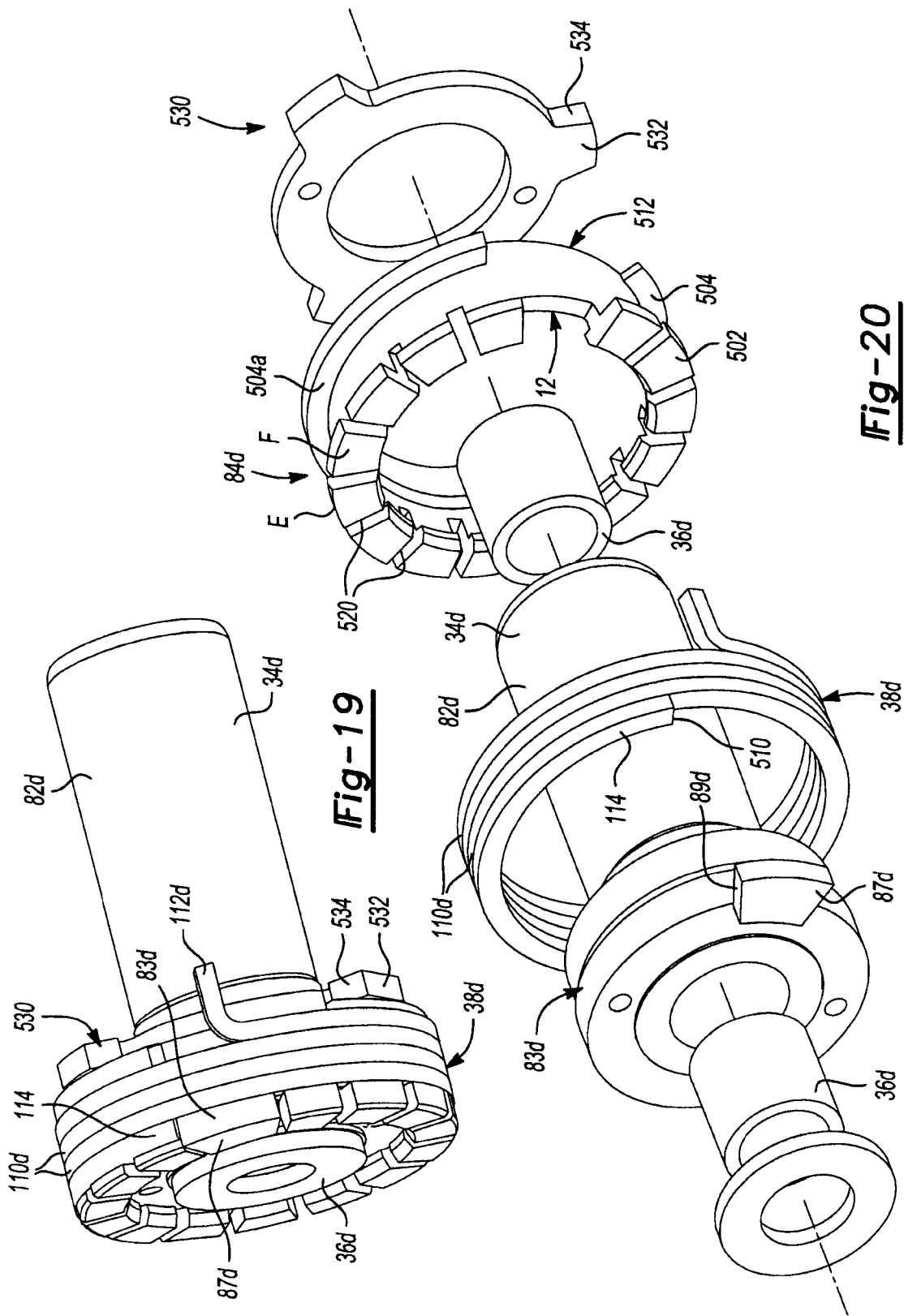

DRIVEN COMPONENT WITH CLUTCH FOR SELECTIVE OPERATION OF COMPONENT

CROSS-REFERENCE TO RELATED APPLICATIONS

This application is a 371 U.S. National Stage of International Application No. PCT/CA2011/001109, filed Oct. 4, 2011, which claims priority to U.S. Provisional Application No. 61/389,452, filed on Oct. 4, 2010, U.S. Provisional Application No. 61/431,006, filed on Jan. 8, 2011, and U.S. Provisional Application No. 61/487,327, filed on May 18, 2011. The contents of the above applications are incorporated herein by reference in their entirety.

INTRODUCTION

The present disclosure generally relates to a driven component with a clutch for selective operation of the component.

Many vehicle engine systems include one or more components, commonly referred to as accessories, that are operated with rotary power supplied by an engine. Examples of such components include without limitation alternators, pumps, compressors, superchargers and fans. Typically these components are mounted to the engine and are coupled to the engine crankshaft my means of belt, a chain or a gear train.

While such components are widely employed, some issues with their operation in a drive system have been identified. For example, such components are commonly configured to operate continuously during operation of the engine. In some cases, however, it may be advantageous to selectively inhibit operation of the component. One such case concerns the operation of a coolant pump or a cooling fan when the engine is relatively cold. It would be desirable, for example, to inhibit operation of the coolant pump or the cooling fan in such situations to permit the engine to heat more rapidly to a desired operating temperature.

International Patent Application Publication Number WO 2010/054487 discloses several components having a clutch assembly that permits selective operation of the component during the operation of an engine. We have noted, however, that while WO 2010/054487 discloses several highly robust clutching systems, there can be instances where these clutching systems are difficult to package into a component. One exemplary situation involves the integration of a clutching system into a vehicle component that is currently in production. Accordingly, there remains a need in the art for a driven, clutched component having a relatively compact clutching system.

SUMMARY

This section provides a general summary of the disclosure, and is not a comprehensive disclosure of its full scope or all of its features.

In one form, the present teachings provide a component that includes a clutch assembly with a driving member, a driven member, a wrap spring and an actuator. The driving member has a clutch surface and is configured to be coupled to a source of rotary power. The wrap spring includes a plurality of helical coils, a tang and an engaging portion. At least a portion of the helical coils is engaged to the clutch surface. The tang extends from a first axial end of the wrap spring. The engaging portion is disposed on a second, opposite axial end of the wrap spring. The engaging portion extends over less than one helical coil. The actuator has an electromagnet, which is mounted coaxially about the driving member, and an armature that is axially movable between a first position and a second position. The driven member is mounted for rotation on the driving member and includes a carrier to which the engaging portion of the wrap spring is rotatably coupled. The wrap spring is configured to transmit rotary power between the driving member and the driven member when the electromagnet is not operated and the armature is in the first position.

In another form, the present teachings provide a component that includes an input member, an output member, a housing and a clutch assembly. The clutch assembly is at least partially housed in the housing and includes a driving member, a driven member, a wrap spring and an actuator. The driving member is coupled for rotation with the input member and has a clutch surface. The driven member is coupled for rotation with the output member. The wrap spring includes a plurality of helical coils, a tang and an engaging portion. At least a portion of the helical coils is engaged to the clutch surface. The tang extends from a first axial end of the wrap spring. The engaging portion is disposed on a second, opposite axial end of the wrap spring. The engaging portion extends over less than one helical coil. The actuator has an actuator housing, an electromagnet, a support bearing and an armature. The actuator housing includes a bearing mount and a housing mount that is spaced apart from the bearing mount along a rotational axis of the driving member. The electromagnet is received in the housing mount concentrically about the driving member. The support bearing is received between the bearing mount and the driving member. The armature is axially movable between a first position and a second position. The driven member is mounted for rotation on the driving member and includes a carrier to which the engaging portion of the wrap spring is rotatably coupled. The wrap spring is configured to transmit rotary power between the driving member and the driven member when the electromagnet is not operated and the armature is in the first position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 11 is a perspective view of a further driven, clutched component constructed in accordance with the teachings of the present disclosure;

FIG. 12 is a longitudinal section view of a portion of the component of FIG. 11;

FIG. 19 is a perspective view of a portion of the driven, clutched component of FIG. 15 illustrating the mounting of the wrap spring and carrier on to the hub of the driven member;

FIGS. 20 and 21 are exploded perspective views of the portion of the driven, clutched component illustrated in FIG. 19;

Corresponding reference numerals indicate corresponding parts throughout the several views of the drawings.

DETAILED DESCRIPTION OF THE VARIOUS EMBODIMENTS

Figure 1:
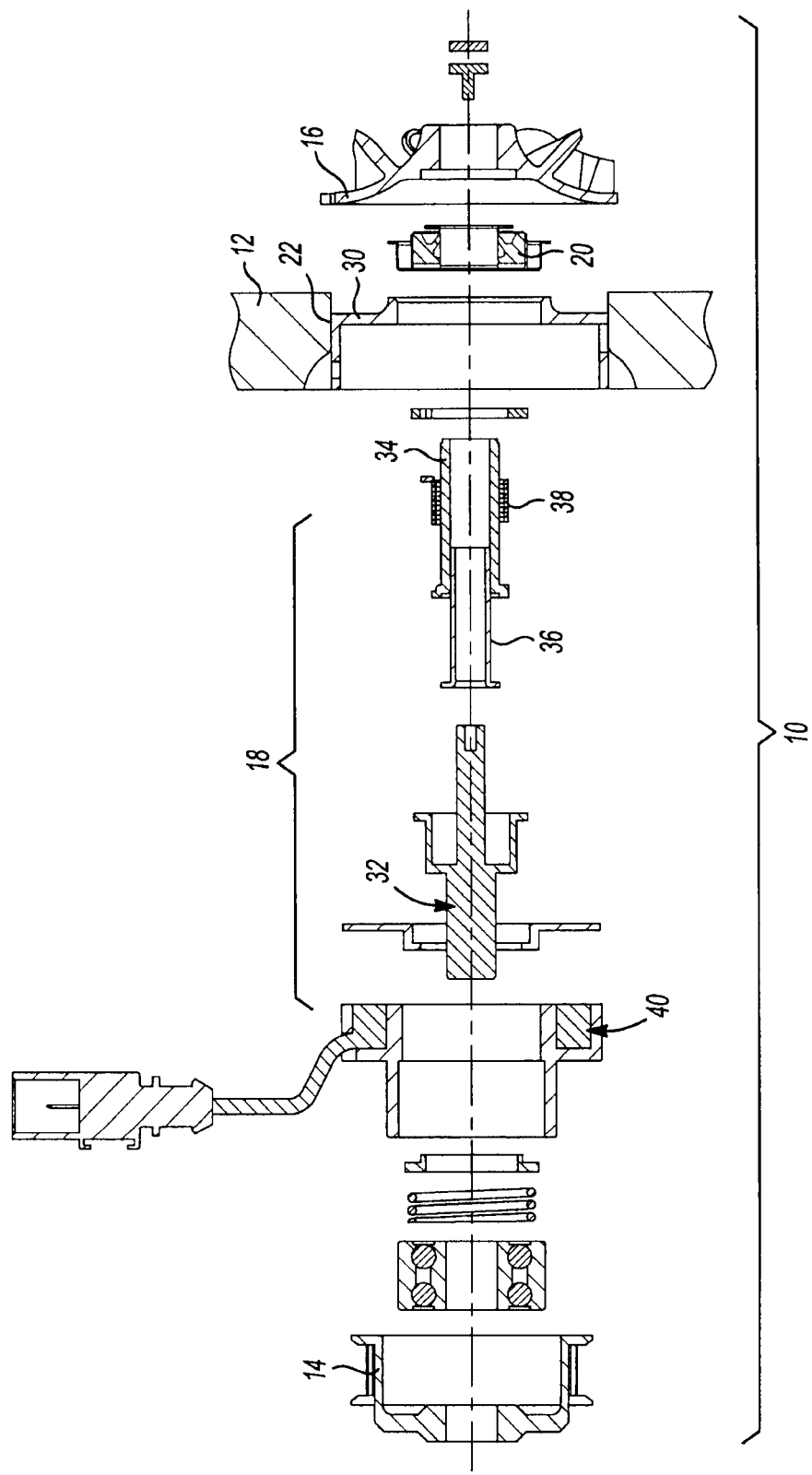
FIG. 1 is an exploded sectional perspective view of a driven, clutched component constructed in accordance with the teachings of the present disclosure.
Figure 2:
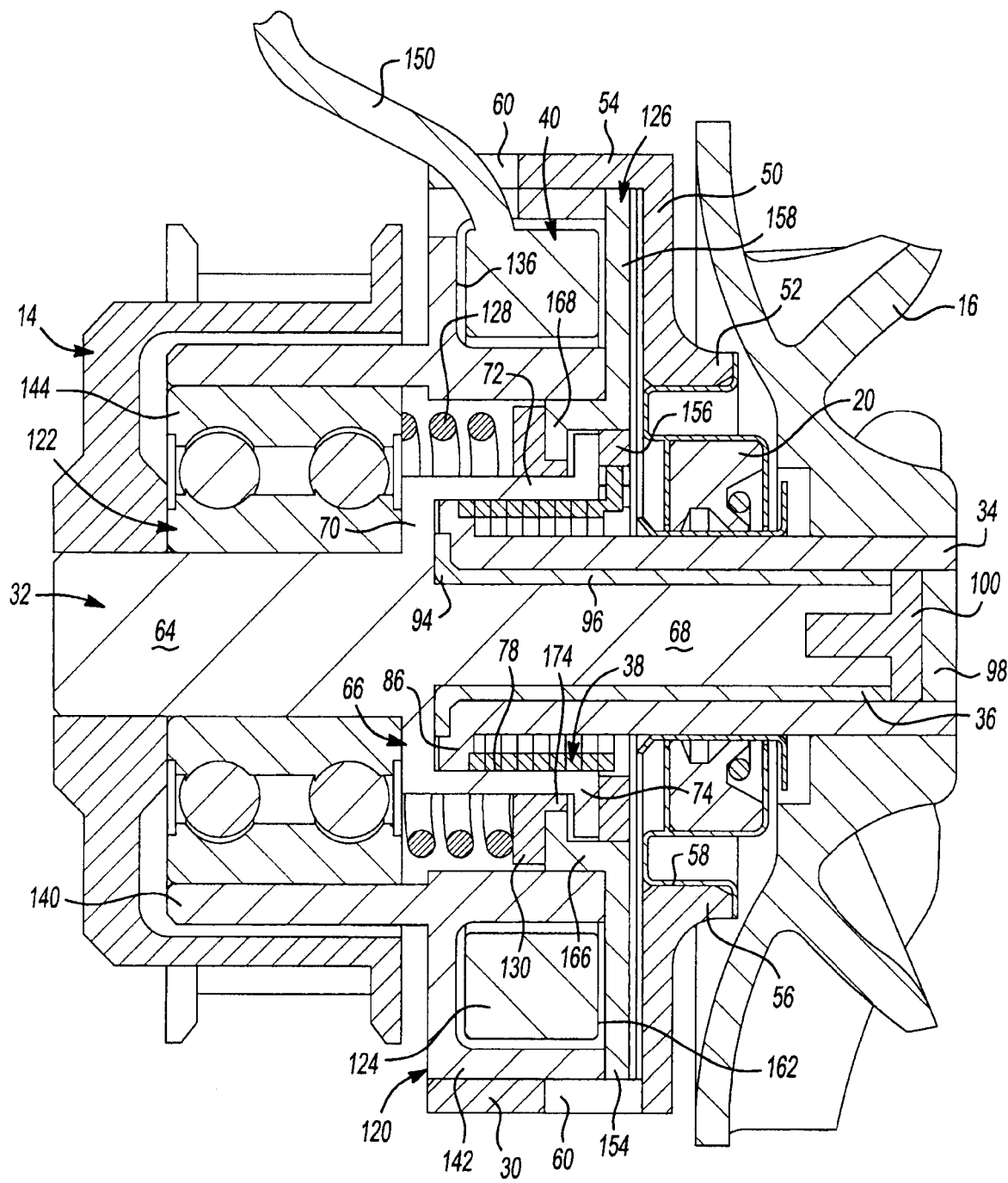
FIG. 2 is a sectional view of a portion of the component of FIG. 1.
Figure 3:
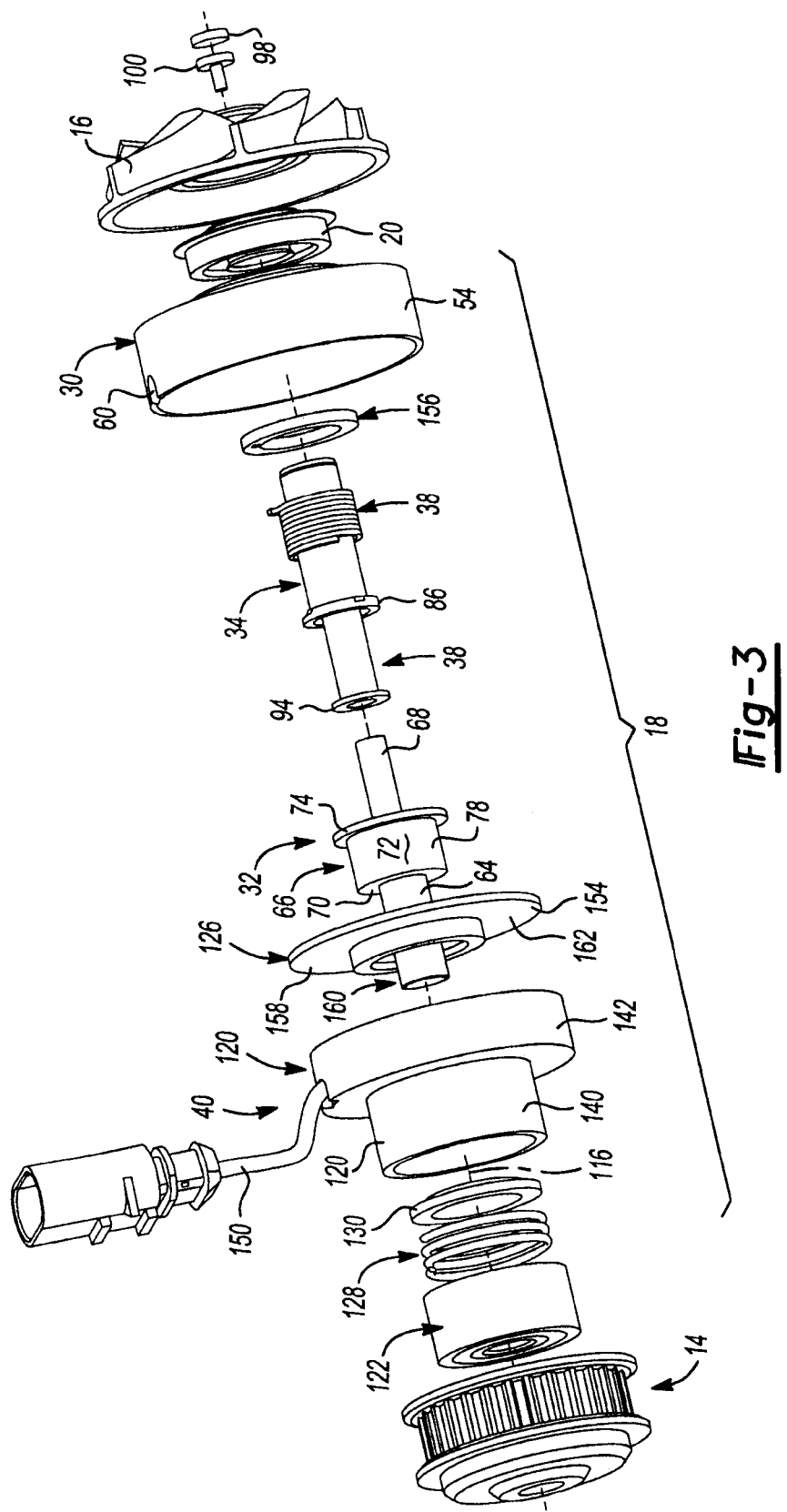
FIG. 3 is an exploded perspective view of the component of FIG. 1.

With reference to FIGS. 1 through 3, a driven, clutched component constructed in accordance with the teachings of the present disclosure is generally indicated by reference numeral 10. The driven, clutched component 10 that is depicted herein is a water pump that is configured to be driven through rotary power supplied thereto via a belt or chain associated with the timing drive of an engine. It will be appreciated, however, that the teachings of the present disclosure have application to various other types of driven components, including without limitation alternators, compressors, pumps, compressors, superchargers, and fans.

The component 10 can include a housing 12, an input member 14, an output member 16, a clutch assembly 18 and a seal 20. The housing 12 can define a clutch pocket 22 for receipt of the clutch assembly 18 as will be discussed in more detail, below.

The input member 14 can be any type of member that is adapted to receive rotary power for operation of the component 10. In the particular example provided, the input member 14 is a pulley that is configured to engage a toothed belt (not shown) that transmits rotary power through a timing drive (not shown), but it will be appreciated that other types of input members, including without limitation sprockets and gears, could be employed for the input member 14.

The output member 16 can be tailored to the particular type of component employed. In the particular example provided, the component 10 is a water pump and the output member 16 is an impeller.

The clutch assembly 18 can include a clutch housing 30, an input or driving shaft 32, an output, or driven shaft 34, a shaft bushing 36, a wrap spring 38 and a clutch actuator 40.

The clutch housing 30 can be a container-like structure, having an annular plate-like end wall 50, a mounting lip 52, and an annular side wall 54. The mounting lip 52 can be coupled to a radially inner side of the end wall 50 and can define a mount 56 and a through bore 58 that extends through the mount 56. The annular side wall 54 can be non-rotatably and sealingly engaged to the portion of the housing 12 that defines the clutch pocket 22. The annular side wall 54 can extend forwardly of the end wall 50 toward the input member 14 and if desired, can include one or more slotted apertures 60 that can be employed for routing electrical wires associated with the clutch actuator 40 and/or to permit any liquid (e.g., oil) in the volume defined by the annular side wall 54 and the end wall 50 to drain from the clutch housing 30.

The driving shaft 32 can include an input portion 64, which can be coupled to the input member 14 for rotation therewith, a power transferring portion 66 and a support portion 68. The power transferring portion 66 can include a first annular portion 70, a hollow cylindrical portion 72, and a second annular portion 74. The first annular portion 70 can be fixedly coupled to the input portion 64 and can extend radially outwardly therefrom. The hollow cylindrical portion 72 can be fixedly coupled to and disposed between the first and second annular portions 70 and 72 and can define a clutch surface 78. The second annular portion 74 can extend radially outwardly from the hollow cylindrical portion 72. The support portion 68 can be coupled to the input portion 64 for rotation therewith and can extend through power transferring portion 66.

Figure 4:
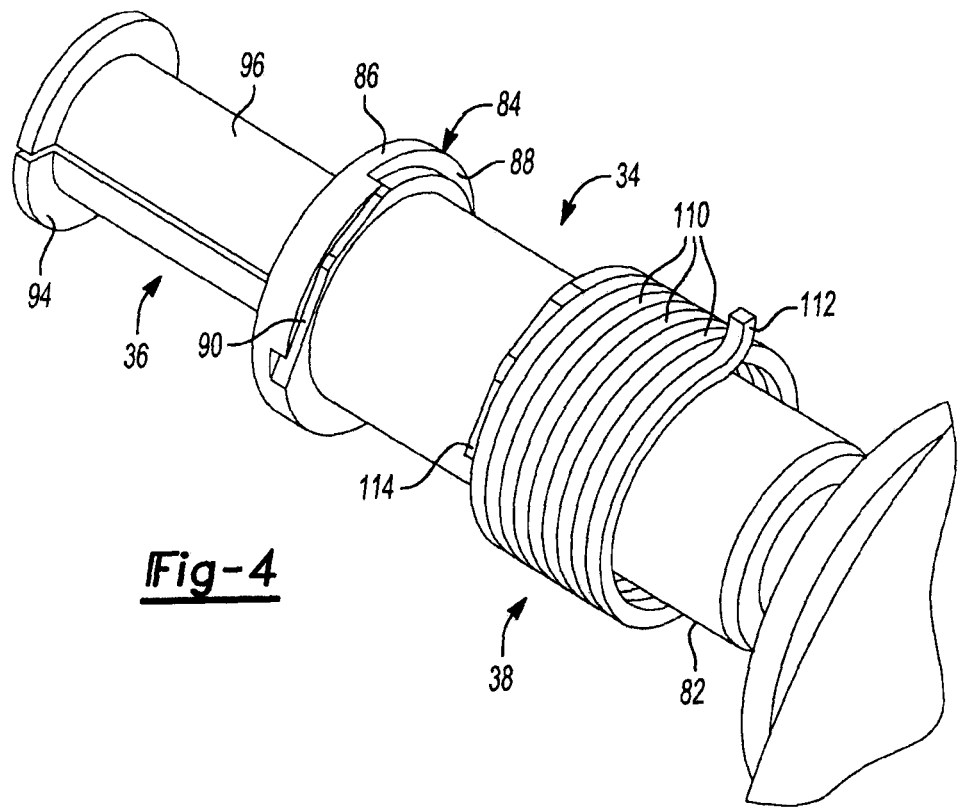
FIG. 4 is an exploded perspective view of a portion of the component of FIG. 1, illustrating the driven shaft, the shaft bushing and the wrap spring in more detail.
Figure 5:
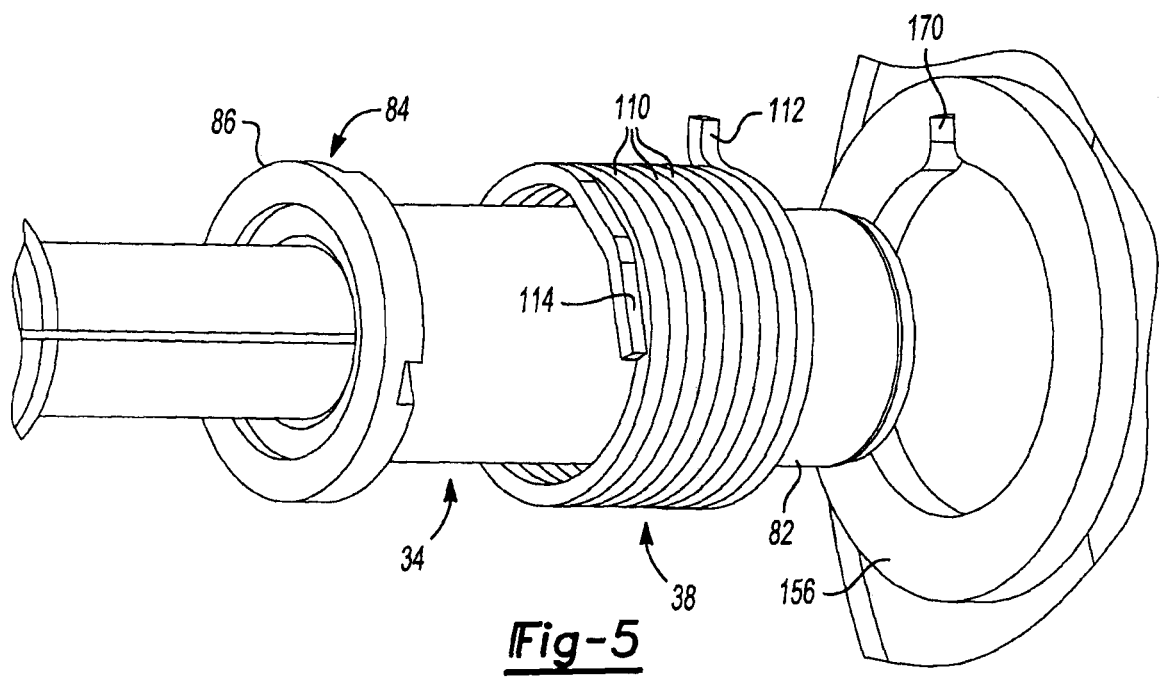
FIG. 5 is an exploded perspective view of a portion of the component of FIG. 1, illustrating the driven shaft, the wrap spring and a portion of the armature in more detail.

With additional reference to FIGS. 4 and 5, the driven shaft 34 can include a tubular portion 82 and a carrier 84. The tubular portion 82 can extend coaxially about the support portion 68 and can be fixedly coupled in any desired manner to the output member 16, such as via an interference fit. The carrier 84 can be coupled to an end of the tubular portion 82 opposite the output member 16 and can include a flange 86 that extends radially outwardly from the tubular portion 82. The flange 86 can define a helical ramp 88 and a spring slot 90.

With reference to FIGS. 2 through 4, the shaft bushing 36 can be received between the driving shaft 32 and the driven shaft 34 and can include a bushing flange 94 and a bushing sleeve 96. The bushing flange 94 can be disposed about the support portion 68 and axially between the first annular portion 70 and the flange 86 on the carrier 84 of the driven shaft 34. The bushing sleeve 96 can be received between the tubular portion 82 of the driven shaft 34 and the support portion 68 of the driving shaft 32.

If desired, the shaft bushing 36 can be axially fixed to the support portion 68 of the driving shaft 32 and a plug 98 can be received in the tubular portion 82 of the driven shaft 34 axially rearward of the driving shaft 32 to inhibit fluid communication through the driven shaft 34. In the particular example provided, a fastener 100 is threadably coupled to an end of the support portion 68 proximate the plug 98 to inhibit rearward movement of the shaft bushing 36 toward the plug 98.

With reference to FIGS. 3 through 5, the wrap spring 38 can be formed of a spring wire and can include a plurality of helical coils 110, a tang 112 and an engagement end 114. The helical coils 110 can be sized to engage the clutch surface 78 in an interference fit. The tang 112 can extend radially outwardly from the helical coils 110 on a side of the wrap spring 38 opposite the input member 14. The engagement end 114 can be mounted on the carrier 84 such that a front axial end of the engagement end 114 abuts the helical ramp 88 and the engagement end 114 is received in the spring slot 90. In the example provided, the engagement end 114 is formed in a manner that is complementary to the spring slot 90. In the particular example provided, the engagement end 114 is generally V-shaped and has a length that is bounded by a circular sector that is centered on the rotational axis 116 of the driving shaft 32 and that has an included angle of less than 180 degrees and preferably between 120 degrees and 60 degrees.

Returning to FIGS. 2 and 3, the clutch actuator 40 can include an actuator housing 120, a support bearing 122, an electromagnet 124, an armature 126, a biasing spring 128 and a spring support 130.

The actuator housing 120 can define an annular chamber 136 for receipt of the electromagnet 124 therein, as well as an annular bearing mount 140 and an annular housing mount 142. The annular bearing mount 140 can be configured to engage an outer bearing race 144 of the support bearing 122, while the housing mount 142 can be configured to engage the annular side wall 54 of the clutch housing 30. It will be appreciated that the actuator housing 120 may be engaged to the clutch housing 30 via an interference fit and that axial positioning of the actuator housing 120 relative to the clutch housing 30 can permit the tuning of the clutch actuator 40 (e.g., to set the distance between the electromagnet 124 and the armature 126).

The support bearing 122 can be received between the input portion 64 of the driving shaft 32 and the annular bearing mount 140 of the actuator housing 120 to support the driving shaft 32 for rotation relative to the housing 12.

The electromagnet 124 can be received in the annular chamber 136 and can be selectively operated to produce a magnetic field for attracting and/or repulsing the armature 126. The electromagnet 124 can include a set of lead wires 150 that can extend through one of the slotted apertures 60 in the clutch housing 30. The lead wires 150 can be configured to be coupled to a source of electrical power.

The armature 126 can comprise an armature plate 154 and a spring holding ring 156. The armature plate 154 can comprise an annular armature member 158 and a retainer 160. The armature plate 154 can be mounted coaxially about the driving shaft 32 and can include a friction surface 162 that can be translated axially (i.e., along the rotational axis of the driving shaft 32). The retainer 160 can include a tubular portion 166, which can extend from a front side of the armature member 158, and an end stop 168 that can be coupled to a side of the tubular portion 166 opposite the armature member 158 and can extend radially inwardly. With additional reference to FIG. 5, the spring holding ring 156 can be an annular structure that can be received in the armature plate 154 and disposed concentrically about the driving shaft 32. A tang slot 170 can be formed in the spring holding ring 156 for receipt of the tang 112 therein. The spring holding ring 156 can be non-rotatably coupled to the armature plate 154 in any desired manner, such as via an interference fit. The armature 126 can be positioned relative to the power transferring portion 66 of the driving shaft 32 such that the second annular portion 74 is disposed axially between the end stop 168 on the retainer 160 and the spring holding ring 156.

Returning to FIGS. 1 through 3, the biasing spring 128 can be disposed between the support bearing 122 and the armature 126 to bias the armature 126 in a first position. The spring support 130 can be abutted against the biasing spring 128 and the retainer 160. In the example provided, the spring support 130 comprises an annular shoulder 174 that is received between the end stop 168 and an outer surface of the power transferring portion 66 of the driving shaft 32 to thereby serve as a bearing or bushing that supports the armature 126 for rotation on the driving shaft 32.

The seal 20 can be any type of seal and is configured to sealing engage the clutch housing 30 and the driven shaft 34. In the particular example provided, the seal 20 is fixedly coupled to the mounting lip 52 of the clutch housing 30 and comprises a lip seal system that is employed to form a seal against the driven shaft 34.

With reference to FIGS. 2, 3 and 5, when rotary power is provided to the input member 14 (e.g., via a timing belt), rotation of the input member 14 will cause corresponding rotation of the driving shaft 32. Since the helical coils 110 of the wrap spring 38 are engaged to the clutch surface 78 via an interference fit, rotation of the driving shaft 32 will tend to cause the wrap spring 38 to rotate with the driving shaft 32. When the electromagnet 124 is not activated and is not generating a magnetic field, the biasing spring 128 will urge the armature 126 in an axial direction away from the actuator housing 120 (i.e., toward the first position) and consequently, the armature 126 will not inhibit rotation of the wrap spring 38. As the engagement end 114 of the wrap spring 38 is received in the spring slot 90 in the carrier 84 to thereby fixedly couple the carrier 84 to the engagement end 114 of the wrap spring 38 for rotation therewith, rotation of the wrap spring 38 with the driving shaft 32 will transmit rotary energy between the wrap spring 38 and the carrier 84 such that the carrier 84 (and therefore the driven shaft 34) will tend to rotate. The wrap spring 38 can be wound in a manner that permits the helical coils 110 to tend to uncoil in response to rotation of the transmission of rotary power from the driving shaft 32 to the driven shaft 34 to thereby more tightly engage the clutch surface 78.

When the electromagnet 124 is activated and a magnetic field is generated, the armature 126 wilt be drawn axially toward a second position (i.e., against the bias of the biasing spring 128) to frictionally engage the actuator housing 120. Frictional engagement between the armature plate 154 and the actuator housing 120 will slow the rotation of the armature 126 relative to the driven shaft 34. As the tang 112 of the wrap spring 38 is received in the tang slot 170 of the spring holding ring 156, the slowing of the armature 126 relative to the driven shaft 34 will cause the helical coils 110 of the wrap spring 38 to coil more tightly and so that a portion of the helical coils 110 disengage the clutch surface 78 on the power transferring portion 66 of the driven shaft 34. It will be appreciated that while not all of the helical coils 110 will disengage the clutch surface 78, the contact between the helical coils 110 and the clutch surface 78 will not be sufficient to transmit enough torque into the wrap spring 38 to drive the output member 16 beyond a predetermined load. In the particular example provided, it is intended that the wrap spring 38 disengage the clutch surface such that the output member 16 is not driven and coolant is not circulated through the engine to which the component 10 is mounted. If, however, coolant is drained from the engine, some rotation of the output member 16 may be occur due to the relatively light loading that would oppose rotation of the driven shaft 34.

Figure 6:
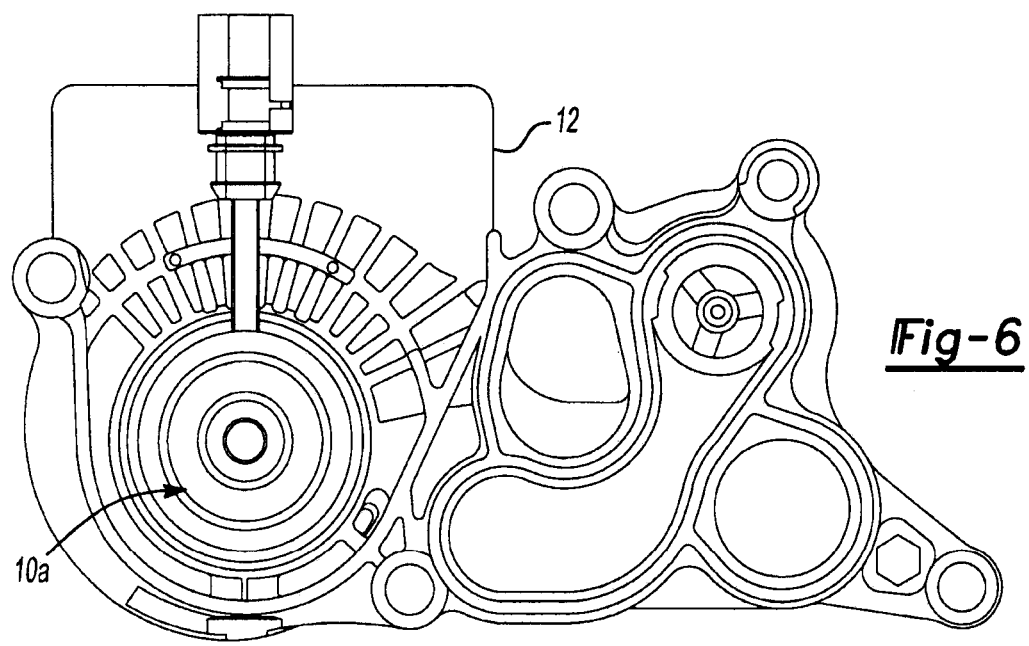
FIG. 6 is a front elevation view of another driven, clutched component constructed in accordance with the teachings of the present disclosure.
Figure 7:
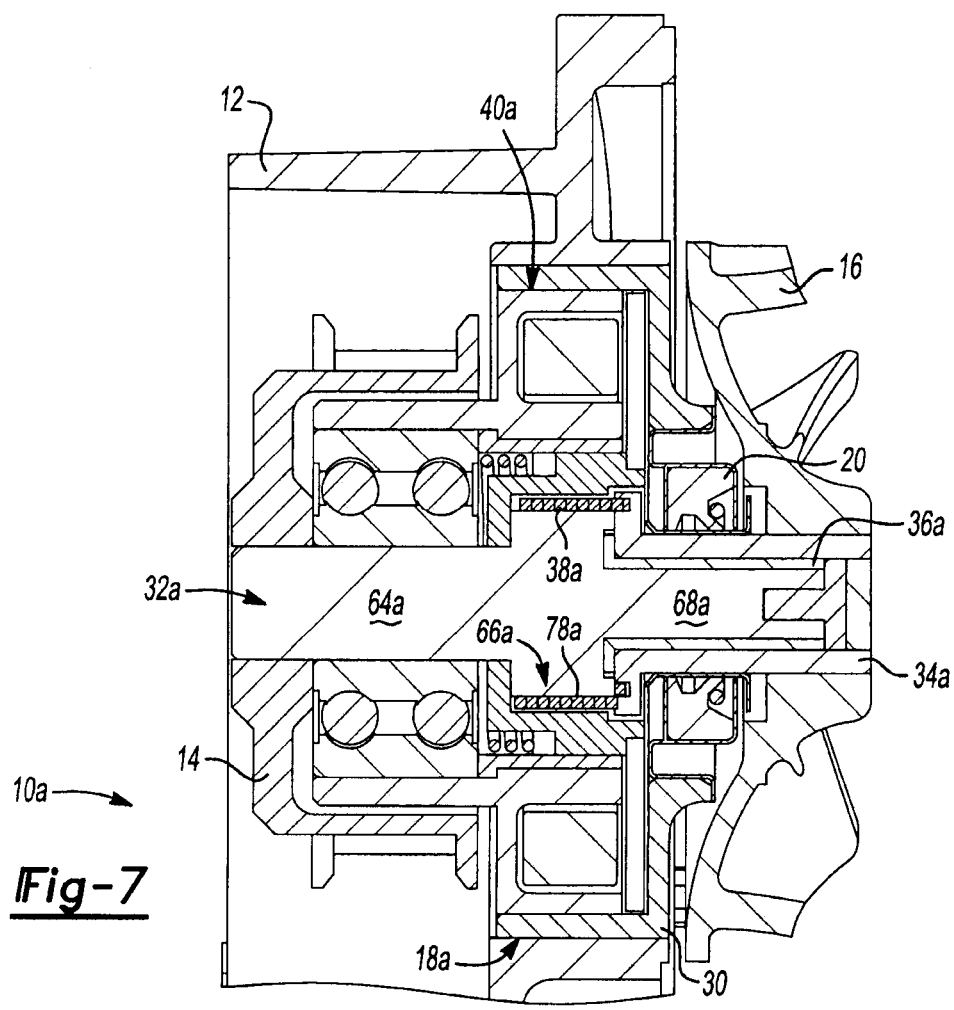
FIG. 7 is a longitudinal section view of the component of FIG. 6.
Figure 8:
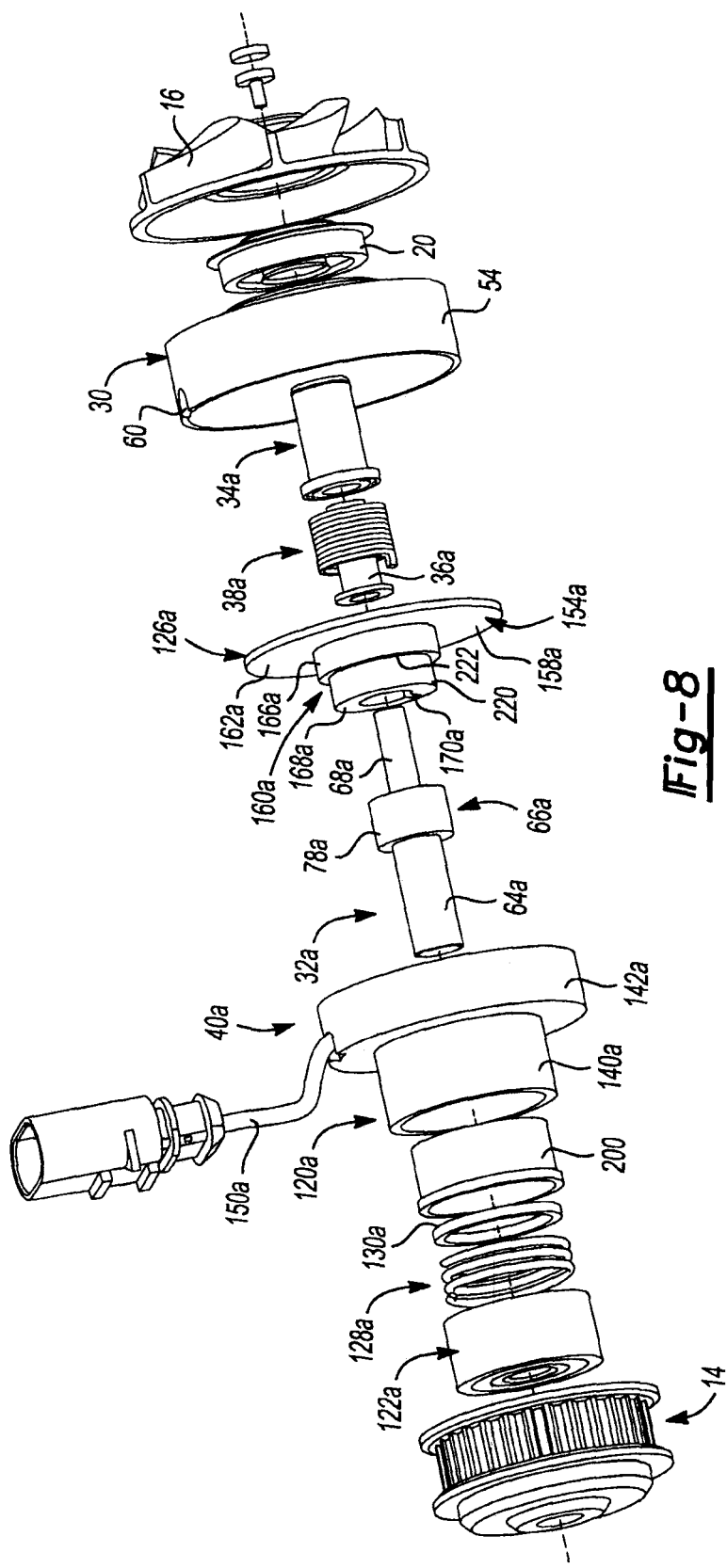
FIG. 8 is an exploded perspective view of a portion of the component of FIG. 6.

With reference to FIGS. 6 through 8, another driven, clutched component constructed in accordance with the teachings of the present disclosure is generally indicated by reference numeral 10a. The driven, clutched component 10a that is depicted herein is a water pump that is configured to be driven through rotary power supplied thereto via a belt or chain associated with the timing drive of an engine. It will be appreciated, however, that the teachings of the present disclosure have application to various other types of driven components, including without limitation alternators, compressors, pumps, compressors, superchargers, and fans.

The component 10a can include a housing 12, an input member 14, an output member 16, a clutch assembly 18a and a seal 20. The clutch assembly 18a can include a clutch housing 30, an input or driving shaft 32a, an output, or driven shaft 34a, a shaft bushing 36a, a wrap spring 38a and a clutch actuator 40a. The housing 12, the input member 14, the output member 16, the seal 20 and the clutch housing 30 can be substantially similar (or identical) to those employed in the example of FIGS. 1 through 5 and as such, further discussion of these components need not be provided herein.

The driving shaft 32 can include an input portion 64a, which can be coupled to the input member 14 for rotation therewith, a power transferring portion 66a and a support portion 68a. The power transferring portion 66a can be a generally cylindrical structure that can be disposed axially between the input portion 64a and the support portion 68a. The power transferring portion 66a can define a clutch surface 78a on its radially outer surface. The support portion 68a can extend axially from the power transferring portion 66.

Figure 9:
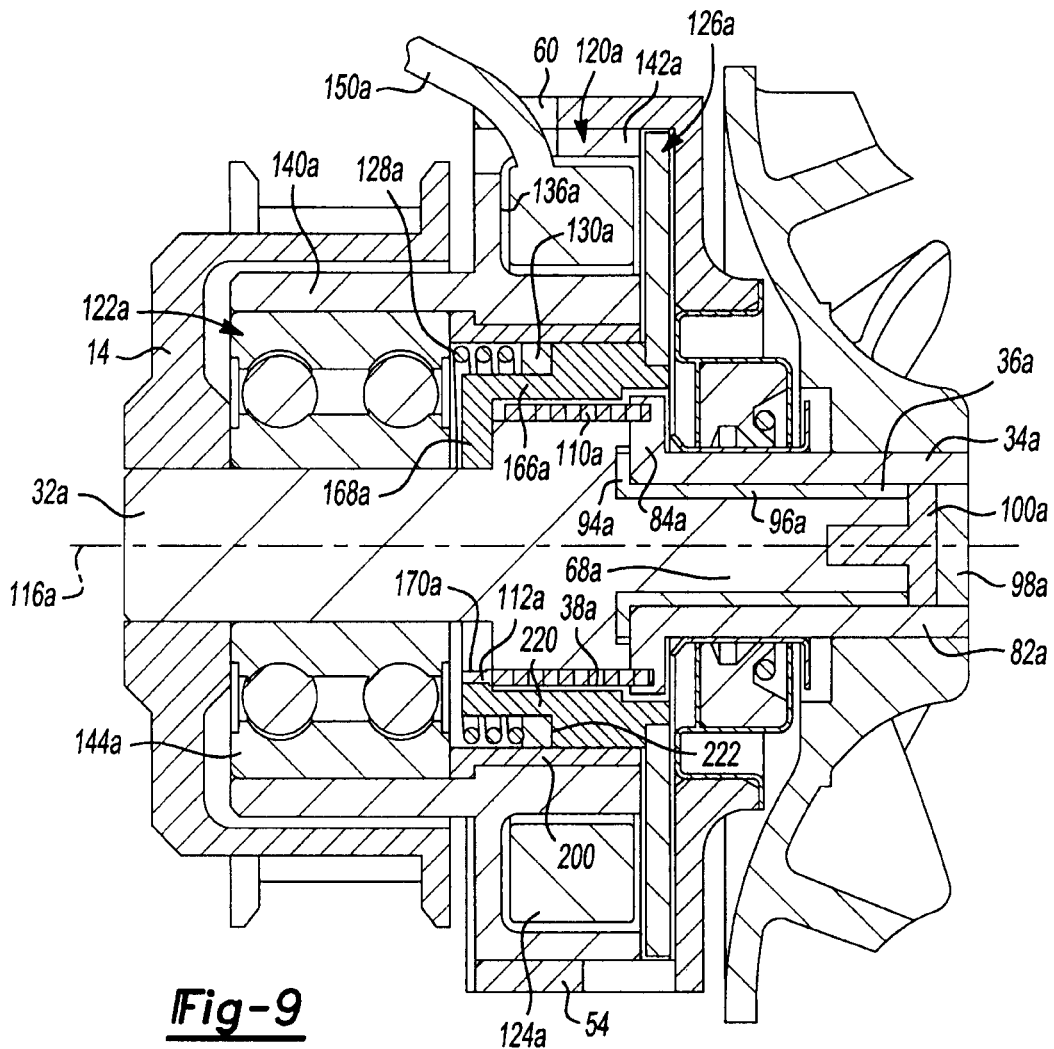
FIG. 9 is an enlarged view of a portion of FIG. 7.
Figure 10:
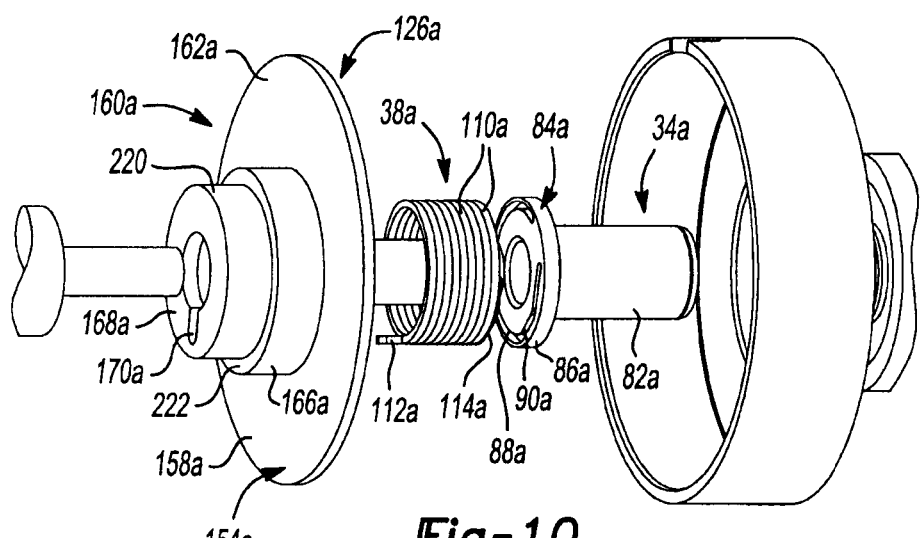
FIG. 10 is an exploded perspective view of a portion of the component of FIG. 6, illustrating the armature, the wrap spring and the driven shaft in more detail.

With additional reference to FIGS. 9 and 10, the driven shaft 34a can include a tubular portion 82a and a carrier 84a. The tubular portion 82a can extend coaxially about the support portion 68a and can be fixedly coupled in any desired manner to the output member 16, such as via an interference fit. The carrier 84a can be coupled to an end of the tubular portion 82 opposite the output member 16 and can include a flange 86a that extends radially outwardly from the tubular portion 82a. The flange 86a can define a helical groove 88a and a spring slot 90a.

The shaft bushing 36a can be received between the driving shaft 32a and the driven shaft 34a and can include a bushing flange 94a and a bushing sleeve 96a. The bushing flange 94a can be disposed about the support portion 68a and axially between the power transferring portion 66 and the flange 86a on the carrier 84a of the driven shaft 34a. The bushing sleeve 96a can be received between the tubular portion 82a of the driven shaft 34a and the support portion 68a of the driving shaft 32a.

If desired, the shaft bushing 36a can be axially fixed to the support portion 68a of the driving shaft 32a and a plug 98a can be received in the tubular portion 82a of the driven shaft 34a axially rearward of the driving shaft 32a to inhibit fluid communication through the driven shaft 34a. In the particular example provided, a fastener 100a is threadably coupled to an end of the support portion 68a proximate the plug 98a to inhibit rearward movement of the shaft bushing 36a toward the plug 98a.

The wrap spring 38a can be formed of a spring wire and can include a plurality of helical coils 110a, a tang 112a and an engagement end 114a. The helical coils 110a can be sized to engage the clutch surface 78a in an interference fit. The tang 112a can extend radially outwardly from the helical coils 110a on a side of the wrap spring 38a opposite the output member 16. The engagement end 114a can be mounted on the carrier 84a such that a front axial end of the engagement end 114a abuts the helical groove 88a and the engagement end 114a is received in the spring slot 90a. The engagement end 114a can be formed in a manner that is complementary to the spring slot 90a. In the particular example provided, the engagement end 114a is generally V-shaped and has a length that is bounded by a circular sector that is centered on the rotational axis 116a of the driving shaft 32a and that has an included angle of less than 180 degrees and preferably between 120 degrees and 60 degrees.

With reference to FIGS. 8 and 9, the clutch actuator 40a can include an actuator housing 120a, a support bearing 122a, an electromagnet 124a, an armature 126a, an armature bushing 200, a biasing spring 128a and a spring support 130a.

The actuator housing 120a can define an annular chamber 136a for receipt of the electromagnet 124e therein, as well as an annular bearing mount 140a and an annular housing mount 142a. The annular bearing mount 140a can be configured to engage an outer bearing race 144a of the support bearing 122a, while the housing mount 142a can be configured to engage the annular side wall 54 of the clutch housing 30. It will be appreciated that the actuator housing 120a may be engaged to the clutch housing 30 via an interference fit and that axial positioning of the actuator housing 120a relative to the clutch housing 30 can permit the tuning of the clutch actuator 40a (e.g., to set the distance between the electromagnet 124a and the armature 126a).

The support bearing 122a can be received between the input portion 64a of the driving shaft 32a and the annular bearing mount 140a of the actuator housing 120a to support the driving shaft 32a for rotation relative to the housing 12 (FIG. 7).

The electromagnet 124a can be received in the annular chamber 136a and can be selectively operated to produce a magnetic field for attracting and/or repulsing the armature 126a. The electromagnet 124a can include a set of lead wires 150a that can extend through one of the slotted apertures 60 in the clutch housing 30. The lead wires 150a can be configured to be coupled to a source of electrical power.

The armature 126a can comprise an armature plate 154a. The armature plate 154a can comprise an annular armature member 158a and a retainer 160a that can be non-rotatably coupled to the armature member 158e. The armature plate 154a can be mounted coaxially about the driving shaft 32a and can include a friction surface 162a that can be translated axially (i.e., along the rotational axis of the driving shaft 32a). The retainer 160a can include a tubular portion 166a, which can extend from a front side of the armature member 158a, and an end stop 168a that can be coupled to a side of the tubular portion 166a opposite the armature member 158a and can extend radially inwardly. A tang slot 170a can be formed in the end stop 168a and can be sized for receipt of the tang 112a therein.

The armature bushing 200 can be received radially between the tubular portion 166a of the retainer 160a and the actuator housing 120a and can support the armature 126a for rotation relative to the housing 12 (FIG. 7).

The biasing spring 128a can be disposed between the support bearing 122a and the armature 126a to bias the armature 126a toward a first position. The spring support 130a can be abutted against the biasing spring 128a and the retainer 160a. In the example provided, the tubular portion 166a includes a necked down portion 220 onto which the biasing spring 128a and the spring support 130a are received and the spring support 130a abuts a shoulder 222 formed at an end of the necked down portion 220.

When rotary power is provided to the input member 14 (e.g., via a timing belt), rotation of the input member 14 will cause corresponding rotation of the driving shaft 32a. Since the helical coils 110a of the wrap spring 38a are engaged to the clutch surface 78a via an interference fit, rotation of the driving shaft 32a will tend to cause the wrap spring 38a to rotate with the driving shaft 32a. When the electromagnet 124a is not activated and is not generating a magnetic field, the biasing spring 128a will urge the armature 126a in an axial direction away from the actuator housing 120a (i.e., toward the first position) and consequently, the armature 126a will not inhibit rotation of the wrap spring 38a. As the engagement end 114a of the wrap spring 38a is received in the spring slot 90a in the carrier 84a to thereby fixedly couple the carrier 84a to the engagement end 114a of the wrap spring 38a for rotation therewith, rotation of the wrap spring 38a with the driving shaft 32a will transmit rotary energy between the wrap spring 38a and the carrier 84a such that the carrier 84a (and therefore the driven shaft 34a) will tend to rotate. The wrap spring 38a can be wound in a manner that permits the helical coils 110a to tend to coil (more tightly) in response to the transmission of rotary power from the driving shaft 32a to the driven shaft 34a.

When the electromagnet 124a is activated and a magnetic field is generated, the armature 126a will be drawn axially toward a second position (i.e. against the bias of the biasing spring 128a) to frictionally engage the actuator housing 120a. Frictional engagement between the armature plate 154a and the actuator housing 120a will slow the rotation of the armature 126a relative to the driven shaft 34a. As the tang 112a of the wrap spring 38a is received in the tang slot 170a of the retainer 160a, the slowing of the armature 126a relative to the driven shaft 34a will cause the helical coils 110a of the wrap spring 38a to uncoil so that a portion of the helical coils 110a disengage the clutch surface 78a on the power transferring portion 66a of the driven shaft 34a. It will be appreciated that while not all of the helical coils 110a will disengage the clutch surface 78a, the contact between the helical coils 110a and the clutch surface 78a will not be sufficient to transmit enough torque into the wrap spring 38a to drive the output member 16 beyond a predetermined load.

With reference to FIGS. 11 and 12, another driven, clutched component constructed in accordance with the teachings of the present disclosure is generally indicated by reference numeral 10b. The driven, clutched component 10b can be generally similar to the component 10a described above and illustrated in FIGS. 6 through 10, except for the placement of various elements of the clutch assembly in a region where they would be exposed to the engine coolant.

The component 10b can include a housing 12 (FIG. 7), an input member 14, an output member 16b, a clutch assembly 18b and a seal 20b. The clutch assembly 18b can include a clutch housing 30, an input or driving shaft 32b, an output, or driven shaft 34b, a shaft bushing 36b, a wrap spring 38a and a clutch actuator 40b. The housing 12 (FIG. 6), the input member 14 and the clutch housing 30 can be substantially similar (or identical) to those employed in the example of FIGS. 1 through 5 or the example of FIGS. 6 through 10 and as such, further discussion of these components need not be provided herein.

The driving shaft 32b can include an input portion 64b, which can be coupled to the input member 14 for rotation therewith and a power transferring portion 66b. The power transferring portion 66b can be a generally cylindrical structure that can be disposed rearward of the input portion 64b. The power transferring portion 66b can define a clutch surface 78b on its radially outer surface and can define a coupling recess 300 on an axial end opposite the input portion 64b.

The driven shaft 34a can be integrally formed with the output member 16b and can include a tubular portion 82b, a carrier 84b, and a support portion 68b. The tubular portion 82b can extend coaxially about the power transferring portion 66b. The carrier 84b can be coupled to an end of the tubular portion 82b and disposed radially between the tubular portion 82b and the support portion 68b. The carrier 84b can define a helical groove (not specifically shown) and a spring slot (not specifically shown) that can be generally similar to the helical groove 88a (FIG. 10) and the spring slot 90a (FIG. 10). The support portion 68b can be disposed concentric with the tubular portion 82b and can extend into the coupling recess 300.

The shaft bushing 36b can include a bushing flange 94b and a bushing sleeve 96b. The bushing sleeve 96b can be disposed in the support portion 68b and can extend axially into the coupling recess 300. The bushing flange 94b can be disposed on an axial end of the bushing sleeve 96b and abutted between an end face of the support portion 68b and an end face of the power transferring portion 66b. A threaded fastener 306 can be employed to fixedly couple the shaft bushing 36b to the driven shaft 34b, as well as to limit axial movement of the output member 16b in a direction away from the driving shaft 32b.

The wrap spring 38b can be formed of a spring wire and can include a plurality of helical coils 110b, a tang 112b and an engagement end 114b. The helical coils 110b can be sized to engage the clutch surface 78b in an interference fit. The tang 112b can extend axially outwardly from the helical coils 110b on a side of the wrap spring 38b opposite the output member 16b. The engagement end 114b can be mounted on the carrier 84b such that a rear axial end of the engagement end 114b abuts the helical groove in the carrier 84b and the engagement end 114b is received in the spring slot. The engagement end 114b can be formed in a manner that is complementary to the spring slot. In the particular example provided, the engagement end 114b is generally V-shaped and has a length that is bounded by a circular sector that is centered on the rotational axis 116b of the driving shaft 32b and that has an included angle of less than 180 degrees and preferably between 120 degrees and 60 degrees.

The clutch actuator 40b can include an actuator housing 120b, a support bearing 122b, an electromagnet 124b, an armature 126b, a biasing spring 128b and a spring support 130b.

The actuator housing 120b can define an annular chamber 136b for receipt of the electromagnet 124b therein, as well as an annular bearing mount 140b and an annular housing mount 142b. The annular bearing mount 140b can be configured to engage an outer bearing race 144b of the support bearing 122b, while the housing mount 142b can be configured to engage the clutch housing 30.

The support bearing 122b can be received between the input portion 64b of the driving shaft 32b and the annular bearing mount 140b of the actuator housing 120b to support the driving shaft 32b for rotation relative to the housing 12 (FIG. 7).

The electromagnet 124b can be received in the annular chamber 136b and can be selectively operated to produce a magnetic field for attracting and/or repulsing the armature 126b. The electromagnet 124b can include a set of lead wires 150b that can extend through the actuator housing 120b. The lead wires 150b can be configured to be coupled to a source of electrical power.

The armature 126b can comprise an armature plate 154b that includes an annular armature member 158b and a retainer 160b that can be non-rotatably coupled to the armature member 158b. The armature plate 154b can be mounted coaxially about the driving shaft 32b forwardly of the power transferring portion 66b and can include a friction surface 162b that can be translated axially (i.e., along the rotational axis of the driving shaft 32b). The retainer 160b can include a tubular portion 166b, which can extend from a front side of the armature member 158b, and a hub portion 330 onto which the armature member 158b can be fixedly mounted. A tang slot 170b can be formed in the rear of the hub portion 330 and can be sized for receipt of the tang 112b therein. The hub portion 330 can be slidably mounted on the input portion 64b of the driving shaft 32b.

The biasing spring 128b can received about the input portion 64b of the driving shaft 32b and can be abutted against the retainer 160b.

The spring support 130b can be fixedly coupled to the input portion 64b of the driving shaft 32b on a side of the biasing spring 128b opposite the retainer 160b. The biasing spring 128b can bias the armature 126b rearwardly toward a first position.

The seal 20b can be received radially between the actuator housing 120b and the tubular portion 166b of the retainer 160b to form a seal there between.

When rotary power is provided to the input member 14 (e.g., via a timing belt), rotation of the input member 14 will cause corresponding rotation of the driving shaft 32b. Since the helical coils 110b of the wrap spring 38b are engaged to the clutch surface 78b via an interference fit, rotation of the driving shaft 32b will tend to cause the wrap spring 38b to rotate with the driving shaft 32b. When the electromagnet 124b is not activated and is not generating a magnetic field, the biasing spring 128b will urge the armature 126b in an axial direction away from the actuator housing 120b (i.e., toward the first position) and consequently, the armature 126b will not inhibit rotation of the wrap spring 38b. As the engagement end 114b of the wrap spring 38b is received in the spring slot in the carrier 84b to thereby fixedly couple the carrier 84b to the engagement end 114b of the wrap spring 38b for rotation therewith, rotation of the wrap spring 38b with the driving shaft 32b will transmit rotary energy between the wrap spring 38b and the carrier 84b such that the carrier 84b (and therefore the driven shaft 34b) will tend to rotate. The wrap spring 38b can be wound in a manner that permits the helical coils 110b to tend to coil more tightly against the clutch surface 78b in response to rotation of the transmission of rotary power from the driving shaft 32b to the driven shaft 34b.

When the electromagnet 124b is activated and a magnetic field is generated, the armature 126b will be drawn axially toward a second position (i.e., against the bias of the biasing spring 128b) to frictionally engage the actuator housing 120b. Frictional engagement between the armature plate 154b and the actuator housing 120b will slow the rotation of the armature 126b relative to the driven shaft 34b. As the tang 112b of the wrap spring 38b is received in the tang slot 170b of the retainer 160b, the slowing of the armature 126b relative to the driven shaft 34b will cause the helical coils 110b of the wrap spring 38b to uncoil so that a portion of the helical coils 110b disengage the clutch surface 78b on the power transferring portion 66b of the driven shaft 34b. It will be appreciated that while not all of the helical coils 110b will disengage the clutch surface 78b, the contact between the helical coils 110b and the clutch surface 78b will not be sufficient to transmit enough torque into the wrap spring 38b to drive the output member 16b beyond a predetermined load.

Figure 13:
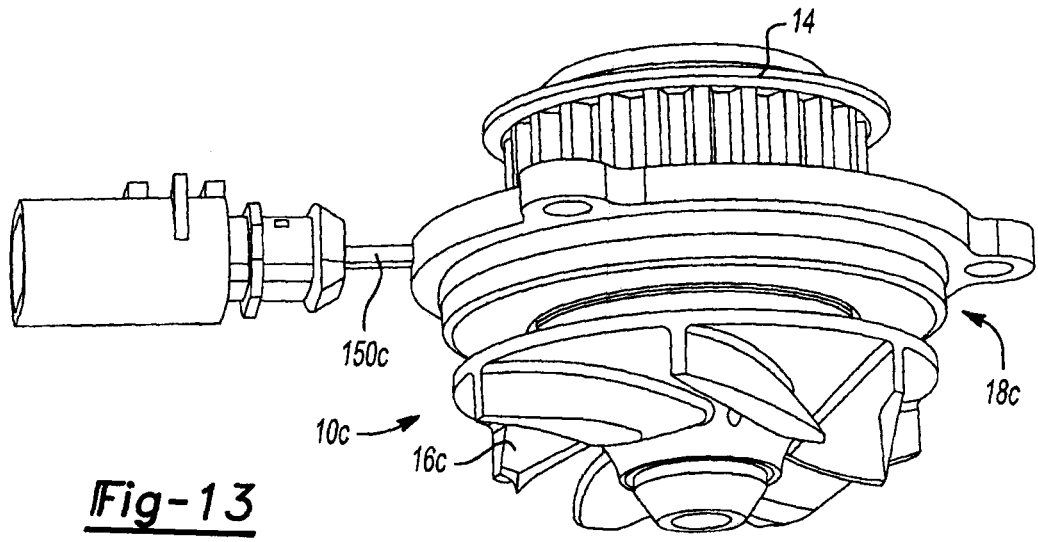
FIG. 13 is a perspective view of a yet another driven, clutched component constructed in accordance with the teachings of the present disclosure.
Figure 14:
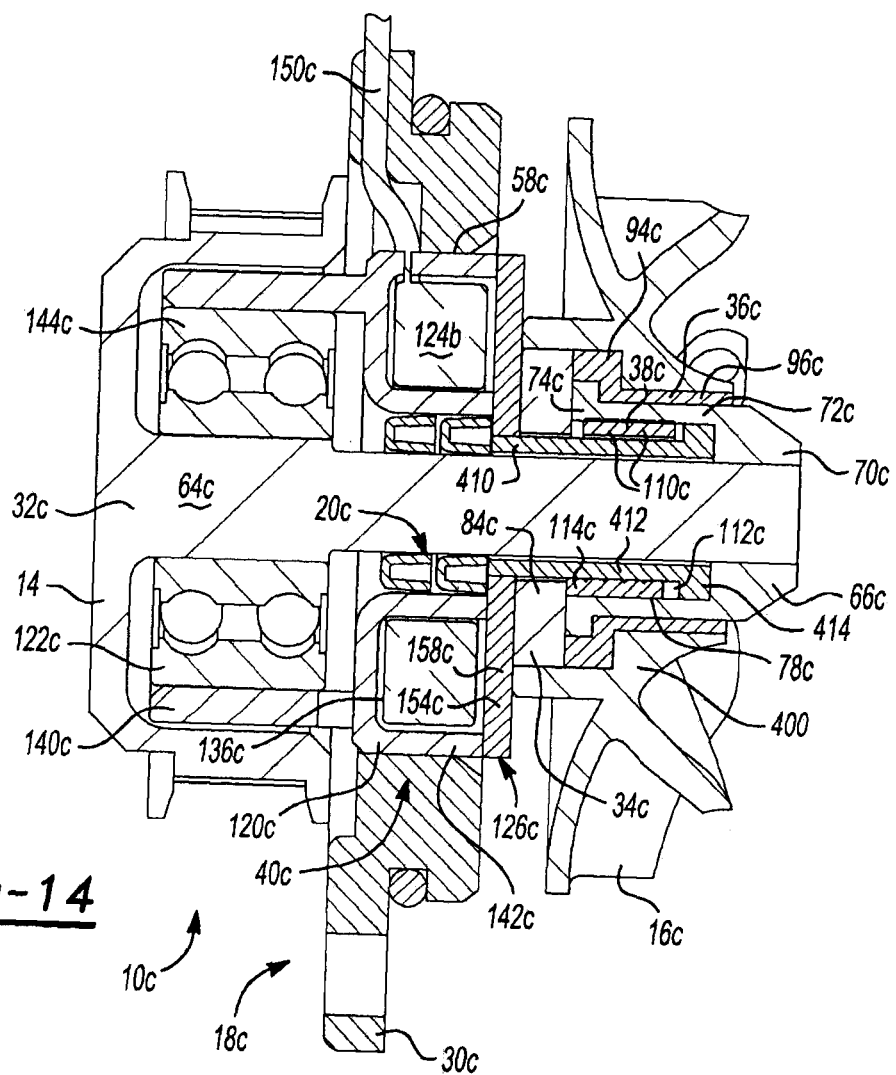
FIG. 14 is a longitudinal section view of a portion of the component of FIG. 13.

With reference to FIGS. 13 and 14, yet another a driven, clutched component constructed in accordance with the teachings of the present disclosure is generally indicated by reference numeral 10c. The driven, clutched component 10c can be similar to the component 10 described above and illustrated in FIGS. 1 through 5, except for the placement of various elements of the clutch assembly in a region where they would be exposed to the engine coolant.

The component 10c can include a housing 12 (FIG. 6), an input member 14, an output member 16c, a clutch assembly 18c and a seal 20c. The clutch assembly 18c can include a clutch housing 30c, an input or driving shaft 32c, an output, or driven shaft 34c, a shaft bushing 36c, a wrap spring 38c and a clutch actuator 40c. The housing 12 (FIG. 6) and the input member 14 can be substantially similar (or identical) to those employed in the example of FIGS. 1 through 5 or the example of FIGS. 6 through 10 and as such, further discussion of these components need not be provided herein.

The output member 16c can be tailored to the particular type of component employed. In the particular example provided, the component 10c is a water pump and the output member 16c is an impeller.

The clutch housing 30c can define a bore 58c through which the driving shaft 32c can extend. The clutch housing 30c can be sealingly engaged to the housing 12 (FIG. 7).

The driving shaft 32c can include an input portion 64c, which can be coupled to the input member 14 for rotation therewith, and a power transferring portion 66c. The power transferring portion 66c can include a first annular portion 70c, a hollow cylindrical portion 72c, and a second annular portion 74c. The first annular portion 70c can be fixedly coupled to the input portion 64c and can extend radially outwardly there from. The hollow cylindrical portion 72c can be fixedly coupled to and disposed between the first and second annular portions 70c and 74c and can define a clutch surface 78c. The second annular portion 74c can extend radially outwardly from the hollow cylindrical portion 72d.

The driven shaft 34c can be a hollow cylindrical component that can be coupled to the output member 16c for common rotation. The driven shaft 34c can be mounted concentrically about the input portion 64c of the driving shaft 32c. The driven shaft 34c can include a carrier 84c that can define a helical ramp (not specifically shown, but similar to the helical ramp 88 shown in FIG. 4) and a spring slot (not specifically shown, but similar to the spring slot 90 shown in FIG. 4).

The shaft bushing 36c can be received between the power transferring portion 66c of the driving shaft 32c and the output member 16c. The shaft bushing 36c can include a bushing flange 94c and a bushing sleeve 96c. The bushing flange 94c can be disposed axially and radially between the second annular portion 74c of the power transferring portion 66c of the driving shaft 32c and a step 400 formed on the output member 16c. The bushing sleeve 96c can be received between the hollow cylindrical portion 72c of the power transferring portion 66c of the driving shaft 32c and the output member 16c.

The wrap spring 38c can be formed of a spring wire and can include a plurality of helical coils 110c, a tang 112c and an engagement end 114c. The helical coils 110c can be sized to engage the clutch surface 78c in an interference fit. The tang 112c can extend axially from the helical coils 110c on a side of the wrap spring 38c opposite the input member 14. The engagement end 114c can be mounted on the carrier 84c such that a front axial end of the engagement end 114c abuts the helical ramp 88 (FIG. 4) and the engagement end 114 is received in the spring slot 90 (FIG. 4).

The clutch actuator 40c can include an actuator housing 120c, a support bearing 122c, an electromagnet 124c and an armature 126c.

The actuator housing 120c can define an annular chamber 136c for receipt of the electromagnet 124c therein, as well as an annular bearing mount 140c and a housing mount 142c. The annular bearing mount 140c can be configured to engage an outer bearing race 144c of the support bearing 122c, while the housing mount 142c can be received into the bore 58c and sealingly engaged to the clutch housing 30c. It will be appreciated that the actuator housing 120c may be engaged to the clutch housing 30c via an interference fit and that axial positioning of the actuator housing 120c relative to the clutch housing 30c can permit the tuning of the clutch actuator 40c (e.g., to set the distance between the electromagnet 124c and the armature 126c).

The support bearing 122c can be received between the input portion 64c of the driving shaft 32c and the annular bearing mount 140c of the actuator housing 120c to support the driving shaft 32c for rotation relative to the housing 12 (FIG. 7).

The electromagnet 124c can be received in the annular chamber 136c and can be selectively operated to produce a magnetic field for attracting and/or repulsing the armature 126c. The electromagnet 124c can include a set of lead wires 150c that can be configured to be coupled to a source of electrical power.

The armature 126c can comprise an armature plate 154c and an armature sleeve 410. The armature plate 154c can comprise an annular armature member 158c, which can be mounted coaxially about the driving shaft 32c. The armature member 158c can include a friction surface 162c that can be translated axially (i.e., along the rotational axis of the driving shaft 32c). The armature sleeve 410 can be received coaxially on the input portion 64c of the driving shaft 32c and can be non-rotatably coupled to the armature member 158c. The armature sleeve 410 can include a tubular portion 412 and a flange member 414. The tubular portion 412 can be coupled for rotation with the armature member 158c and extend rearwardly there from into the hollow cylindrical portion 72c of the power transferring portion 66c of the driving shaft 32c. The flange member 414 can be coupled to an end of the tubular portion 412 opposite the armature member 158c. A tang slot (not specifically shown, but similar to the tang slot 170 shown in FIG. 5) can be formed in the flange member 414 for receipt of the tang 112c on the wrap spring 38c therein.

The seal 20c can be any type of seal and is configured to sealing engage the actuator housing 120c and the driven shaft 34c. In the particular example provided, the seal 20c comprises a lip seal system that is employed to form a seal against the driven shaft 34c.

When rotary power is provided to the input member 14 (e.g., via a timing belt), rotation of the input member 14 will cause corresponding rotation of the driving shaft 32c. Since the helical coils 110c of the wrap spring 38c are engaged to the clutch surface 78c via an interference fit, rotation of the driving shaft 32c will tend to cause the wrap spring 38c to rotate with the driving shaft 32c. When the electromagnet 124c is not activated and is not generating a magnetic field, the armature 126c can rotate with the driving shaft 32c, since the engagement end 114 (FIG. 5) of the wrap spring 38c is received in the spring slot 90 (FIG. 5) in the carrier 84c. It will be appreciated that rotation of the wrap spring 38c with the driving shaft 32c will transmit rotary energy between the wrap spring 38c and the carrier 84c such that the carrier 84c (and therefore the driven shaft 34c) will tend to rotate. The wrap spring 38c can be wound in a manner that permits the helical coils 110c to tend to uncoil in response to the transmission of rotary power from the driving shaft 32c to the driven shaft 34c.

When the electromagnet 124c is activated and a magnetic field is generated, the armature 126c will be drawn axially toward a second position to frictionally engage the actuator housing 120c. Frictional engagement between the armature plate 154c and the actuator housing 120c will slow the rotation of the armature 126c relative to the driven shaft 34c. As the tang 112 (FIG. 5) of the wrap spring 38c is received in the tang slot 170 (FIG. 5) of the flange member 414, the slowing of the armature 126c relative to the driven shaft 34c will cause the helical coils 110c of the wrap spring 38c to coil more tightly and so that a portion of the helical coils 110c disengage the clutch surface 78c on the power transferring portion 66c of the driven shaft 34c. It will be appreciated that while not all of the helical coils 110c will disengage the clutch surface 78c, the contact between the helical coils 110c and the clutch surface 78c will not be sufficient to transmit enough torque into the wrap spring 38c to drive the output member 16c beyond a predetermined load.

In the foregoing examples, it will be appreciated that if desired, the friction surfaces (i.e., the portion of the armature that contacts another member, such as the actuator housing, to rotationally slow the armature relative to the driving shaft and/or the mating surface on the component that the armature contacts) could include a friction material, such as a friction paper or coating, that is configured to tailor the frictional characteristics of the joint between the armature and the other component (e.g., the actuator housing) to provide the clutch assembly with desired performance characteristics. It will also be appreciated that if desired, the wire that forms the wrap spring can be lubricated with a suitable material, which could comprise any type of lubricant or lubricious material.

It will also be appreciated that in the foregoing examples the volume for packaging the clutch assembly into the component is highly limited. We conceived these examples for a situation in which the amount of room for packaging the clutch assembly was so severely limited that the size of the wrap spring 38 (FIG. 4) as measured over the helical coils 110 (FIG. 4) is less than 15 mm in diameter (i.e., a circular cross-sectional area into which the wrap spring is packaged is less than or equal to 176.7 mm$^2$.

It should also be appreciated that the wrap spring in each of the foregoing examples is configured such that rotational energy is introduced to the wrap spring over all or substantially all of the helical coils and that this rotational energy is transmitted into the carrier through the engagement end and in a direction that is generally aligned to the longitudinal axis of the wire that forms the wrap spring. As the engagement end is generally V-shaped in the example provided, the rotational energy is transmitted through the apex of the V-shape on the engagement end and to the carrier at the apex of the spring slot. Accordingly, those of skill in the art will appreciate that the particular type of wrap spring clutch employed herein operates on a different principle than wrap springs that are have two sets of helical coils (each set being engaged to a different shaft) that are engaged to employed to transmit rotary power from one of the shafts to the other. In contrast, the wrap spring clutch employed in these examples employs less than one full turn of wire to transmit the rotary power into the carrier.

Figure 15:
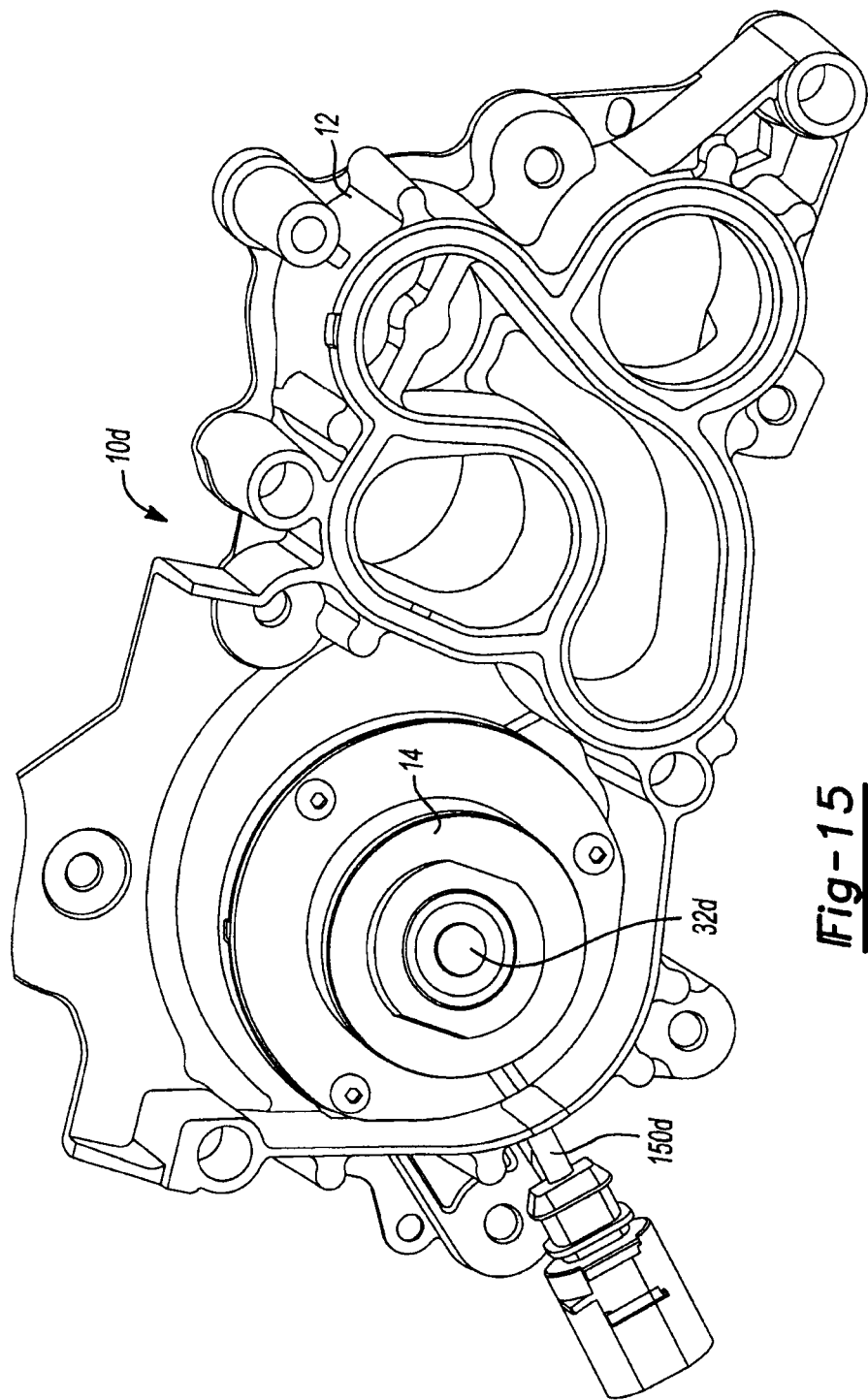
FIG. 15 is a perspective view of a fifth exemplary driven, clutched component constructed in accordance with the teachings of the present disclosure.
Figure 16:
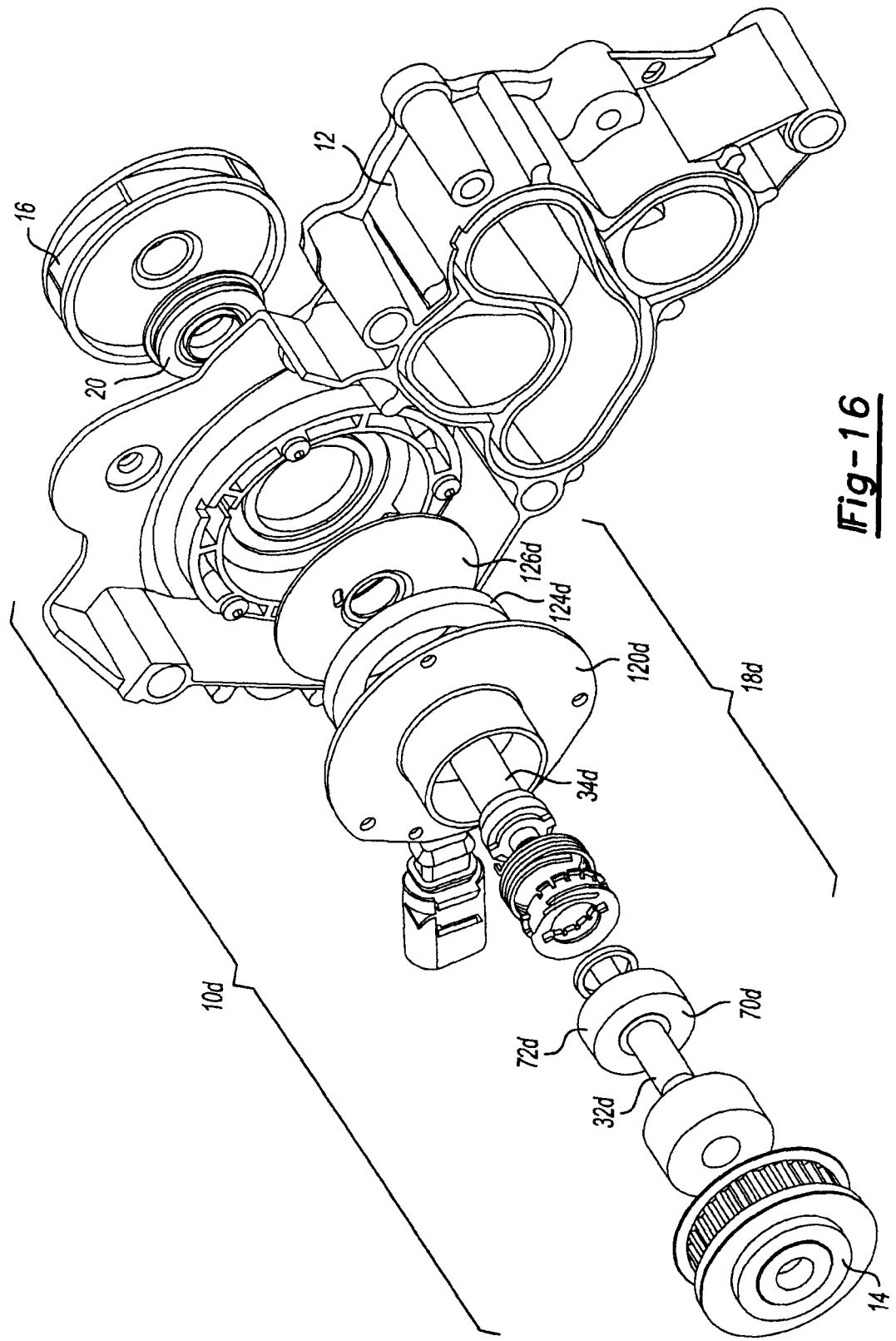
FIG. 16 is an exploded perspective view of the driven, clutched component of FIG. 15.

With reference to FIGS. 15 and 16, a fifth clutch component constructed in accordance with the teachings of the present disclosure is generally indicated by reference numeral 10d. The driven, clutched component 10d that is depicted herein is a water pump that is configured to be driven through rotary power supplied thereto via a belt or chain associated with the timing drive of an engine. It will be appreciated, however, that the teachings of the present disclosure have application to various other types of driven components, including without limitation alternators, compressors, pumps, compressors, superchargers, and fans.

Figure 17:
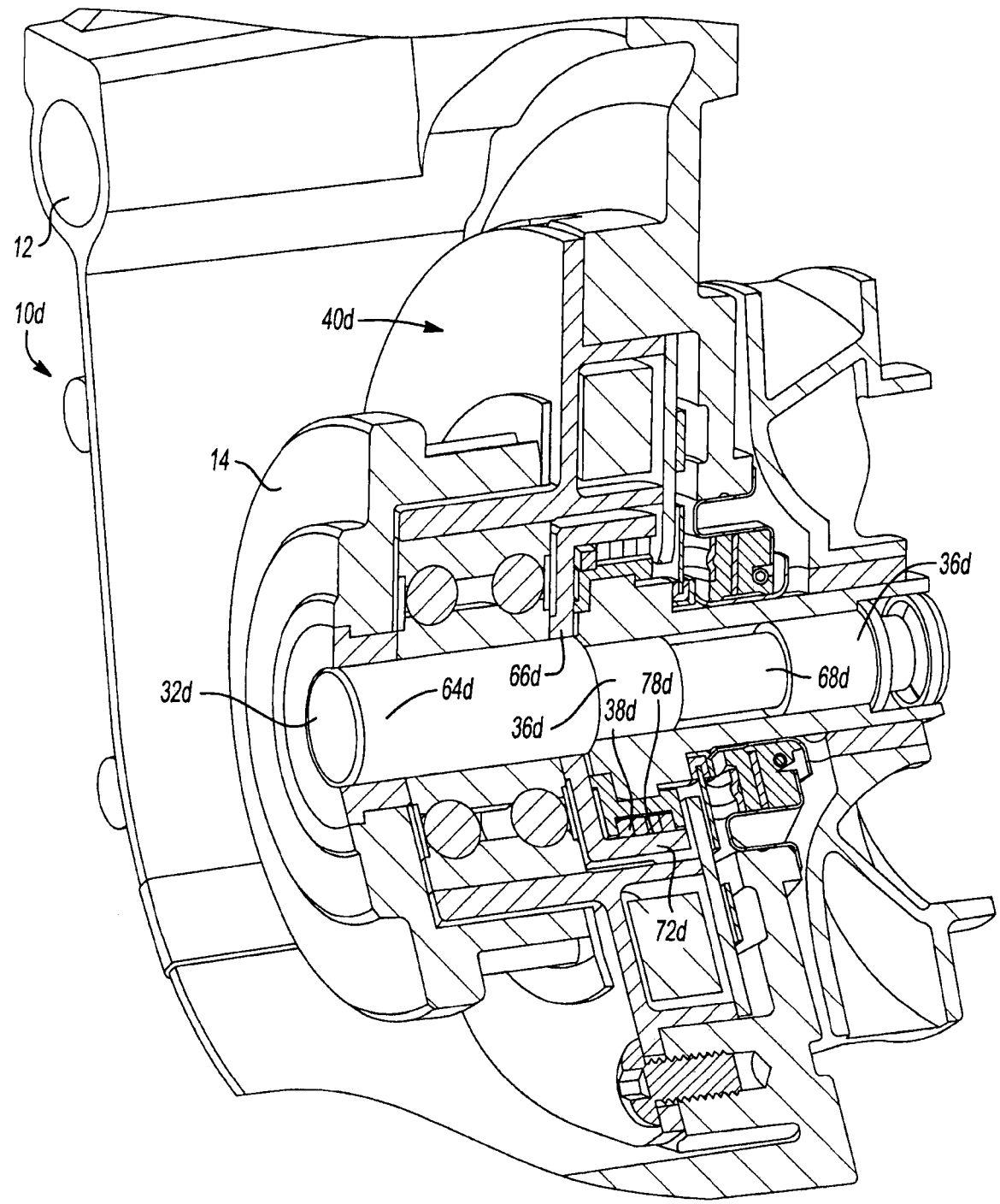
FIG. 17 is a perspective view in partial section of a portion of the driven, clutched component of FIG. 15.

With reference to FIGS. 16 and 17, the component 10d can include a housing 12, an input member 14, an output member 16, a clutch assembly 18d and a seal 20. The clutch assembly 18d can include an input or driving shaft 32d, an output, or driven shaft 34d, a plurality of shaft bushings 36d, a wrap spring 38d and a clutch actuator 40d. The housing 12, the input member 14, the output member 16, and the seal 20d can be substantially similar (or identical) to those employed in the example of FIGS. 1 through 5 and as such, further discussion of these components need not be provided herein.

The driving shaft 32d can include an input portion 64d, which can be coupled to the input member 14d for rotation therewith, a power transferring portion 66a and a support portion 68a. The power transferring portion 66d can be a generally cylindrical structure that can be disposed axially between the input portion 64d and the support portion 68d. The power transferring portion 66d can define a first annular portion 70d, a second annular portion 74d and a clutch surface 78d on the radially inner surface of the second annular portion 72d. The power transferring portion 66d can be formed of any suitable material, such as hardened steel and if desired, can be unitarily/integrally formed with the remainder of the driving shaft 32d. In the particular example provided, the power transferring portion 66d is a cup-like structure that is integrally formed with the remainder of the drive shaft 32d and is formed of hardened steel. Alternatively, the power transferring portion 66d could be a discrete, component that can be fixedly coupled to the input portion 64d by a suitable means, such as an interference fit and/or a weld (e.g., friction weld, laser weld). If desired, a heat dissipating means may be formed into the power transmitting portion 66d. For example, the radially outer surface of the power transmitting portion 66d could be formed in a manner that increases the effective area of the radially outer surface as compared to the cylindrically-shaped surface that is depicted in the present example. Exemplary forming methods include the formation of grooves GG and/or raised ridges RR on the power transmitting portion 66d (FIG. 18), or the knurling of the radially outer surface. The support portion 68d can extend axially from the power transferring portion 66d.

Figure 18:
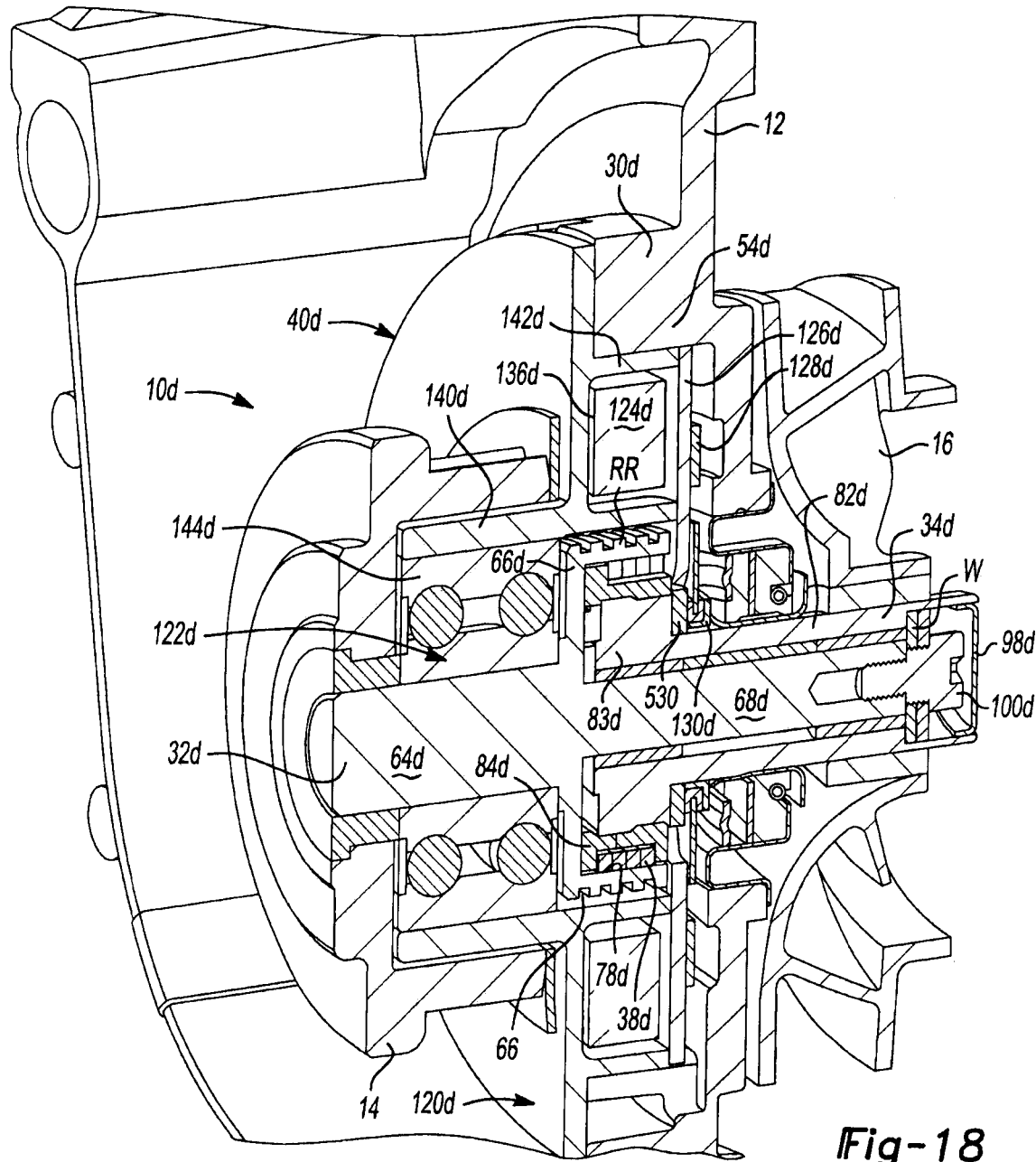
FIG. 18 is a section view of a portion of the driven, clutched component of FIG. 15.
Figure 21:
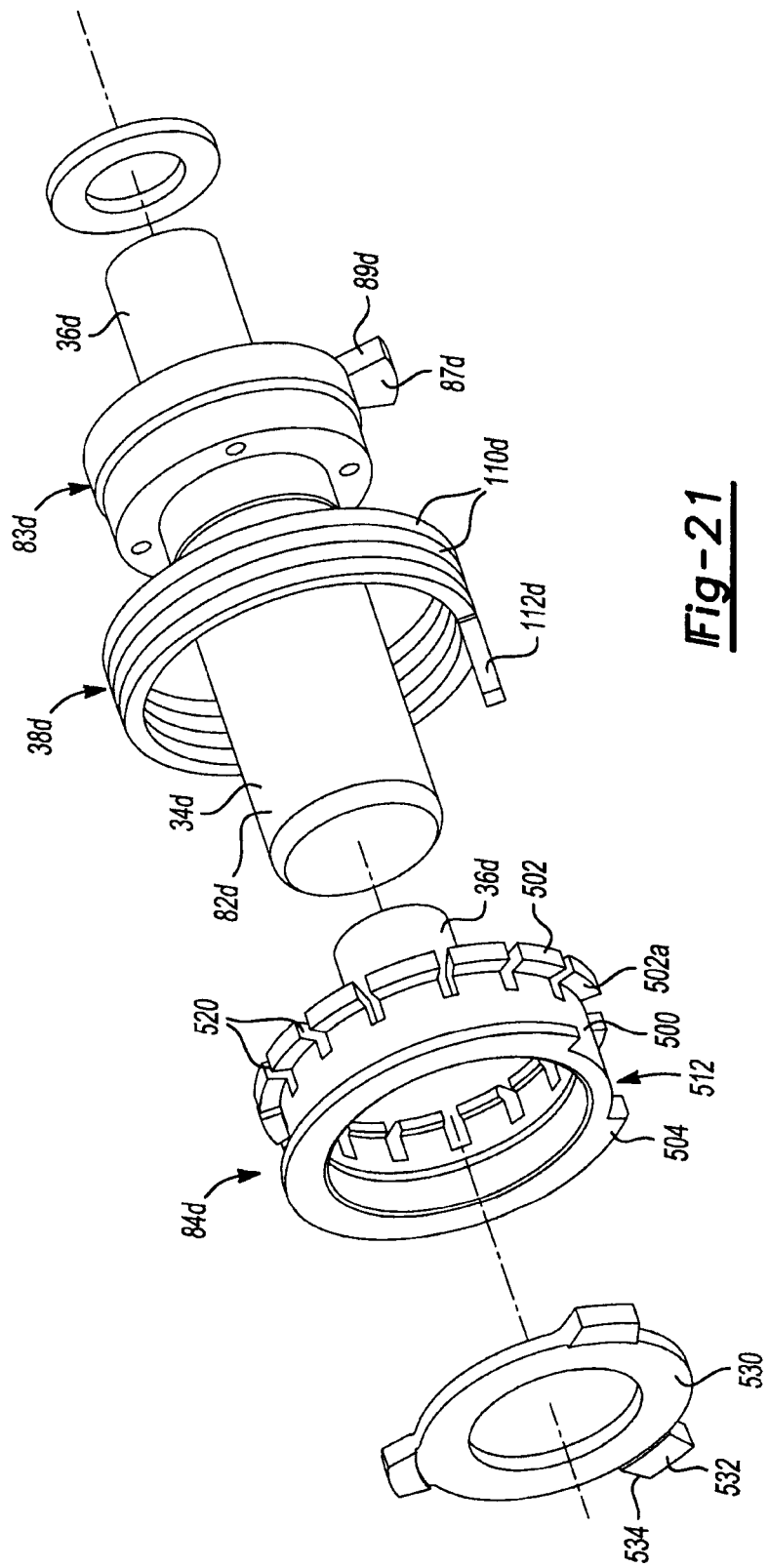

With additional reference to FIG. 18, the driven shaft 34d can include a tubular portion 82d and a hub 83d. The tubular portion 82d can extend coaxially about the support portion 68d and can be fixedly coupled in any desired manner to the output member 16, such as via an interference fit. Additionally or alternatively, a) the inside diameter of the output member 16 could be molded with axial grooves, which could be press fit over matching axial grooves formed (e.g., machined, roll formed) into the driven shaft 34d; b) the output member 16 could be adhesively bonded, brazed, soldered or welded to the driven shaft 34d; the driven shaft 34d could be textured (e.g., knurled or splined) to improve the integrity of a press-fit interface with the output member 16; and/or the bore of the output member 16 could be engaged to the driven shaft 34d via threads.

With reference to FIGS. 18 through 21, the hub 83d can be coupled to an end of the tubular portion 82d opposite the output member 16 and can include a drive tang 87d that extends radially outwardly from the tubular portion 82d. The drive tang 87d can define a tang face 89d that will be discussed in more detail below.

The shaft bushings 36d can be received on the support portion 68d radially between the driving shaft 32d and the driven shaft 34d. In the particular example provided, the shaft bushings 36d are split friction bushings that are engaged to the inside diametrical surface of the driven shaft 34d, but it will be appreciated that any appropriate type of bearing or bushing could be employed. A plug 98d can be received in the tubular portion 82d of the driven shaft 34d axially rearward of the driving shaft 32d to inhibit fluid communication through the driven shaft 34d. A fastener 100d can be threadably coupled to an end of the support portion 68d proximate the plug 98d to inhibit rearward movement of one or more of the shaft bushings 36d toward the plug 98d. If desired, one or more washers can be employed to form additional seals or control friction. In the example provided, one or more Teflon® washers W is employed to reduce friction at the interface with the driven shaft 34d. While a threaded fastener 100d is shown, it will be appreciated that any type of fastener may be used, including a headed pin that is press-fit to a hole in the driving shaft 32d.

The wrap spring 38d can be received on a carrier 84d that can be mounted on the hub 83d. The wrap spring 38d can be formed of a spring wire and can include a plurality of helical coils 110d, a tang 112d and an engagement end 114. The helical coils 110d can be sized to engage the clutch surface 78d in an interference fit. The tang 112d can extend axially outwardly from the helical coils 110d on a side of the wrap spring 38d opposite the input member 14.

The carrier 84d can be an annular structure having a hollow, generally cylindrical body 500, a first radial end wall 502 and a second radial end wall 504. The body 500 can be received between the hub 83d and the helical coils 110d. The first and second radial end walls 502 and 504 can abut the opposite axial ends of the helical coils 110d and, if desired, can include a helically shaped surface for abutting the surface of associated ones of the helical coils 110d. In the particular example provided, the abutting surfaces 502a and 504a of the first and second radial end walls 502 and 504, respectively, are continuously helically shaped, but it will be appreciated that the helical contouring may be accomplished in a non-continuous manner, such as via respective sets of projections that extend axially inwardly. The first radial end wall 502 and optionally the body 500 can define a recess R that can be sized and shaped to receive the drive tang 87d such that the front axial face of the hub 83d is approximately coplanar with the front axial face of the first radial end wall 502. The first radial end wall 502 can be configured to permit rotation of the carrier 84d relative to the hub 83d through a limited angle. At least a portion of the hub 83d can extend axially rearwardly past the first radial end wall 502 such that the tang face 89d can abut an axial end face 510 of the engagement end 114 of the wrap spring 38d. The second radial end wall 504 can extend only partly about the circumference of the body 500 to as to define a tang opening or slot 512 through which the tang 112d can extend.

In some instances, it may be desirable to design the carrier 84d such that it has a sufficiently low rotational inertia. Accordingly, the carrier 84d can be formed of a suitable plastic (e.g., a glass-filled nylon, such as nylon 4-6), a thin metal (e.g., sheet metal) or a light-weight metal (e.g., titanium, aluminum, metal powder) and can be formed via any suitable process, including stamping, roll forming/swaging, compression & sintering, casting (investment casting, die casting), molding (injection molding), and/or machining. As will be appreciated, other techniques for lightening the carrier 84*d* may be additionally or alternatively employed. For example, lightening holes or slots 520 can be formed into the carrier 84*d* at one or more locations. It will be appreciated that while slots 520 are shown as being formed axially through the first radial end wall 502 and into the body 500, lightening holes could formed in any desired manner. In the particular example provided, the slots 520 also help to create flexible "fingers" F having a chamfered edge E. The fingers F can deflect radially inwardly when the wrap spring 38*d* is pushed over the first radial end wall 502 to install the wrap spring 38*d* onto the carrier 84*d*. It will be appreciated that once installed to the carrier 84*d*, the wrap spring 38*d* conforms to the carrier 84*d* in a relatively tight manner so that there is substantially no axial end play.

A hub cap 530 can be fixedly coupled to the hub 83*d* in any desired manner, such as an interference fit or a weld. The hub cap 530 can abut the second radial end wall 504 on a side opposite the wrap spring 38*d* and can cooperate with the drive tang 87*d* to confine the carrier 84*d* in an axial direction on the driven shaft 34*d*. The hub cap 530 can comprise a decoupling tab 532 that can be configured to contact the tang 112*d*. In the particular example provided, the decoupling tab 532 includes a tab face 534 that can contact the tang 112*d* to collapse the wrap spring 38*d* as will be discussed in more detail below. It will be appreciated that the radial location of the tab face 534 relative to the tang face 89 need fall within predetermined tolerances and as such, the hub cap 530 and hub 83*d* can have features or elements that can aid in the proper orientation of one to the other. In the particular example provided a pair of holes are formed in both the hub cap 530 and the hub 83*d*. The holes are configured to receive guide pins that can maintain the hub cap 530 in a predetermined orientation relative to the hub 83*d* while the hub cap 530 is being assembled and/or fixedly coupled to the hub 83*d*.

Returning to FIGS. 16 and 18, the clutch actuator 40*d* can include an actuator housing 120*d*, a support bearing 122*d*, an electromagnet 124*d*, an armature 126*d*, a biasing spring 128*d* and a spring support 130*d*.

The actuator housing 120*d* can define an annular chamber 136*d* for receipt of the electromagnet 124*d* therein, as well as an annular bearing mount 140*d* and an annular housing mount 142*d*. The annular bearing mount 140*d* can be configured to engage an outer bearing race 144*d* of the support bearing 122*d*, while the housing mount 142*d* can be configured to engage the annular side wall 54*d* of the a clutch housing 30*d* (which can be integrally formed with the housing 12) into which the actuator housing 120*d* is received. It will be appreciated that the actuator housing 120*d* may be engaged to the housing 30*d* via an interference fit and that axial positioning of the actuator housing 120*d* relative to the housing 30*d* can permit the tuning of the clutch actuator 40*d* (e.g., to set the distance between the electromagnet 124*d* and the armature 126*d*).

The support bearing 122*d* can be received between the input portion 64*d* of the driving shaft 32*d* and the annular bearing mount 140*d* of the actuator housing 120*d* to support the driving shaft 32*d* for rotation relative to the housing 12.

Figure 22:
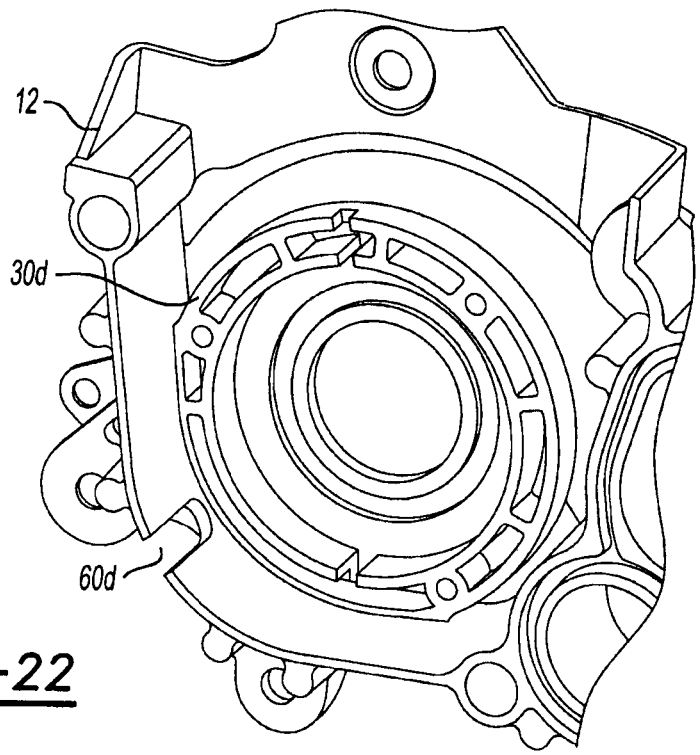
FIG. 22 is a perspective view of a portion of the driven, clutched component illustrating the housing in more detail.

The electromagnet 124*d* can be received in the annular chamber 136*d* and can be selectively operated to produce a magnetic field for attracting and/or repulsing the armature 126*d*. The electromagnet 124*d* can include a set of lead wires 150*d* (FIG. 15) that can extend through a slotted aperture 60 (FIG. 22) in the housing 30*d*. The lead wires 150*d* can be configured to be coupled to a source of electrical power.

Figure 23:
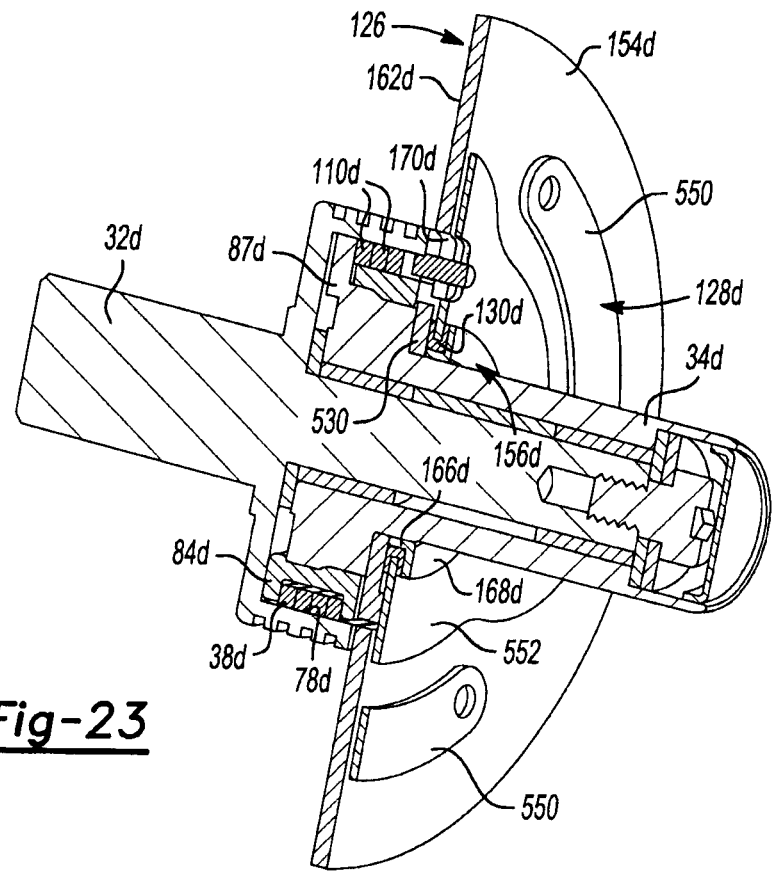
FIG. 23 is a sectional view of a portion of the driven, clutched component of FIG. 15 illustrating the driving shaft, the driven shaft, the armature, the wrap spring and the biasing spring in more detail.

With reference to FIGS. 18 and 23, the armature 126*d* can comprise an armature plate 154*d* and a spring stop 156*d*. The armature plate 154*d* can be mounted coaxially about the driving shaft 32*d* and can include a friction surface 162*d* that can be translated axially (i.e., along the rotational axis of the driving shaft 32*d*). The armature plate 154*d* can define a central aperture that can receive the hub cap 530 therethrough. The spring stop 156*d* can be axially fixedly coupled to the driven shaft 34*d* and can include a tubular portion 166*d*, which can extend through the hole in the armature plate 154*d*, and an end stop 168*d* that can be coupled to an axial end of the tubular portion 166*d* opposite the hub cap 530. The end stop 168*d* can extend radially outwardly from the tubular portion 166*d* and can cooperate with the hub cap 530 to form an annular channel into which the spring support 130*d* can be received. A tang slot 170*d* can be formed in the armature plate 154*d* and optionally through the biasing spring 128*d* for receipt of the tang 112*d* therein.

The biasing spring 128*d* can be disposed between the hub cap 530 and the spring stop 156*d* to bias the armature 126*d* in a first position. In the particular example provided, the biasing spring 128*d* is a leaf spring having a plurality of arcuate arms 550 that spiral outwardly from an annular spring body 552. The distal ends of the arms 550 are fixedly coupled to the armature plate 154*d* in any desired manner, such as rivets (not shown), while the proximal ends of the arms 550 are fixedly coupled to the spring body 552. The spring body 552 is received in the spring support 130*d*, which is rotatably received in the annular channel formed by the end stop 168*d* and the hub cap 530. The biasing spring 128*d* can be configured to bias the armature plate 154*d* axially toward the spring stop 156*d*.

With reference to FIGS. 16, 18, 20 and 23, when rotary power is provided to the input member 14 (e.g., via a belt), rotation of the input member 14 will cause corresponding rotation of the driving shaft 32*d*. Since the helical coils 110*d* of the wrap spring 38*d* are engaged to the clutch surface 78*d* via an interference fit, rotation of the driving shaft 32*d* will tend to cause the wrap spring 38*d* to rotate with the driving shaft 32*d*. When the electromagnet 124*d* is not activated and is not generating a magnetic field, the biasing spring 128*d* will urge the armature 126*d* in an axial direction toward the actuator housing 120*d* (i.e., toward the first position) and consequently, the armature 126*d* will not inhibit rotation of the wrap spring 38*d*. As the axial end face 510 of the engagement end 114 of the wrap spring 38*d* is abutted against the tang face 89*d* on the drive tang 87*d*, rotary power received through the helical coils 110*d* can be transmitted into the hub 83*d* via the engagement end 114 of the wrap spring 38*d* and the drive tang 87*d*. Accordingly, it will be appreciated that rotation of the wrap spring 38*d* with the driving shaft 32*d* in a first predetermined rotational direction will transmit rotary energy between the wrap spring 38*d* and the hub 83*d* such that the hub 83*d* (and therefore the driven shaft 34*d*) will tend to rotate in the first predetermined rotational direction. The wrap spring 38*d* can be wound in a manner that permits the helical coils 110*d* to tend to uncoil in response to the transmission of rotary power from the driving shaft 32*d* to the driven shaft 34*d* to thereby more tightly engage the clutch surface 78*d*.

When the electromagnet 124*d* is activated and a magnetic field is generated, the armature 126*d* will be drawn axially toward a second position (i.e., against the bias of the biasing spring 128*d*) to frictionally engage the actuator housing 120*d*.

Frictional engagement between the armature plate 154d and the actuator housing 120d will slow the rotation of the armature 126d relative to the driven shaft 34d. As the tang 112d of the wrap spring 38d is received in the tang slot 170d in the armature plate 154d, the slowing of the armature 126d relative to the driven shaft 34d will cause the helical coils 110d of the wrap spring 38d to coil more tightly and so that a portion of the helical coils 110d disengage the clutch surface 78d on the power transferring portion 66d of the driven shaft 34d. It will be appreciated that while not all of the helical coils 110d will disengage the clutch surface 78d, the contact between the helical coils 110d and the clutch surface 78d will not be sufficient to transmit enough torque into the wrap spring 38d to drive the output member 16 beyond a predetermined load. In the particular example provided, it is intended that the wrap spring 38d disengage the clutch surface 78d such that the output member 16 is not driven and coolant is not circulated through the engine to which the component 10d is mounted. If, however, coolant is drained from the engine, some rotation of the output member 16 may be occur due to the relatively light loading that would oppose rotation of the driven shaft 34d.

It will be appreciated from the foregoing that although the carrier and hub configuration is described in conjunction with an opening clutch spring (i.e., a wrap spring that expands radially outwardly to engage a clutch surface to transmit rotary power), the teachings of the present disclosure could also be used in a clutch configuration that employs a closing clutch spring (i.e., a wrap spring that constricts radially inward to engage a clutch surface to transmit rotary power). It will be appreciated from the foregoing that although the carrier and hub configuration is described in an environment that is isolated from engine coolant (herein after referred to as being a "dry" environment, despite the optional use of lubricants, including greases, oils and friction fluids on the interface between the wrap spring and the clutch surface), the teachings of the present disclosure also have application in clutch configurations where the carrier and hub are immersed in engine coolant (hereinafter referred to as a "wet" environment).

Figure 24:
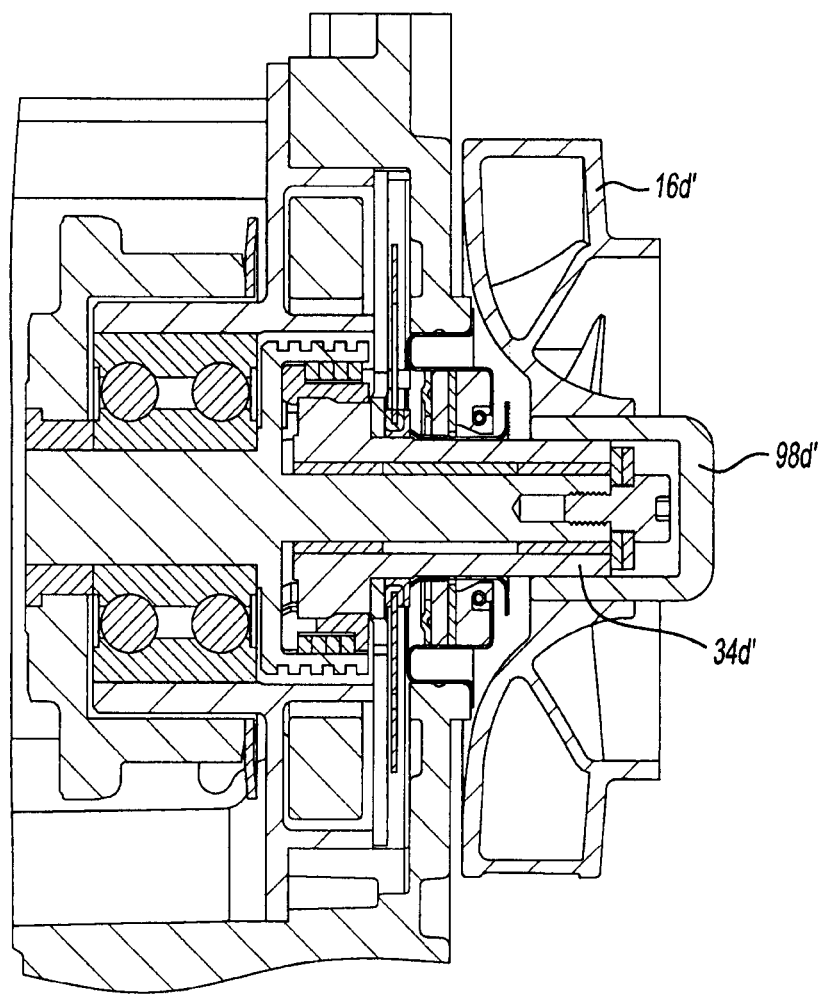
FIG. 24 is a sectional view similar to that of FIG. 18 but illustrating an output member with an integral plug.

FIG. 24 illustrates an alternative configuration in which the plug 98d' is integrally formed with the output member 16d'. In this example, the output member 16d' is press-fit onto the driven member 34d', which creates a seal in the radial direction between the output member 16d' and the driven member 34d'. The plug 98d' closes an axial end of the bore in the output member 16d' (i.e., the bore into which the driven member 34d' is received) and as such, seals the driven member 34d' in the axial direction.

Figure 25:
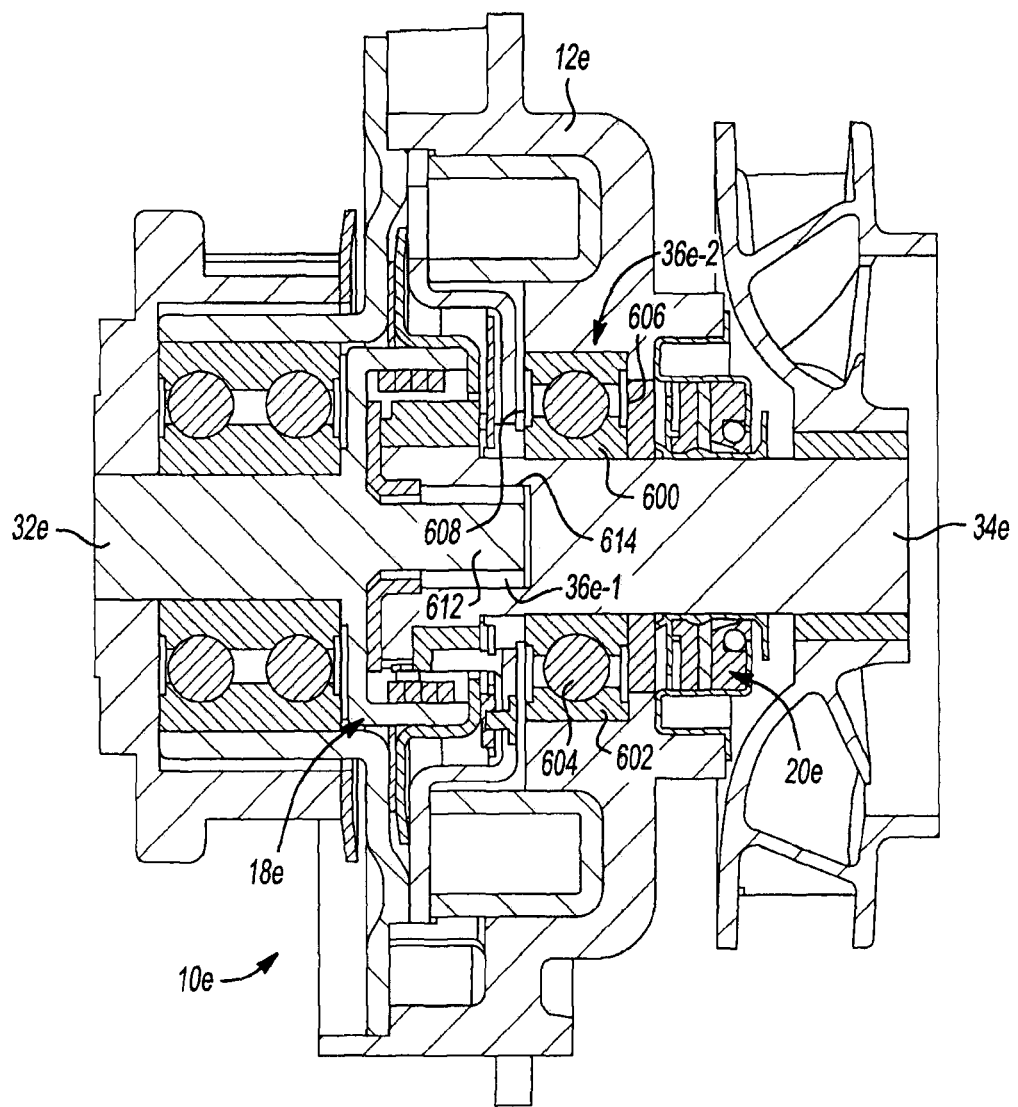
FIG. 25 is a sectional view of a portion of another driven, clutched component constructed in accordance with the teachings of the present disclosure.

With reference to FIG. 25, another driven, clutched component constructed in accordance with the teachings of the present disclosure is generally indicated by reference numeral 10e. The component 10e can be generally similar to the component 10d shown in FIG. 18, except for the configuration of the driven shaft, its mounting to the housing and its coupling to the driving shaft.

In the example of FIG. 25, a first end of the driven shaft 34e is supported for rotation on an end of the driving shaft 32e via a first bearing 36e-1, while a second end of the driven shaft 34e is supported for rotation relative to the housing 12e via a second bearing 36e-2. The first and second bearings 36e-1 and 36e-2 can be any type of bearing; including a journal bearing, a needle bearing, a ball bearing, or any other mechanical bearing. In the particular example provided, the first bearing 36e-1 is a journal bearing while the second bearing 36e-2 is a ball bearing having an inner race 600, an outer race 602, a plurality of bearing balls 604, and first and second end seals 606 and 608. The first bearing 36e-1 can be received on a necked-down portion 612 of the driving shaft 32e and received into a corresponding pocket 614 formed in the driven shaft 34e. A suitable lubricant, such as a grease, may be employed to lubricate the interface between the first bearing 36e-1 and one or both of the driving and driven shafts 32e and 34e. In the example provided, the first bearing 36e-1 is received in a press-fit manner into the pocket 614 in the driven shaft 34e so as to be non-rotatable relative to the driven shaft 34e. It will be appreciated, however, that the driven shaft 34e could alternatively have a necked-down portion that is received into a pocket formed in the driving shaft 32e.

The inner race 600 of the second bearing 36e-2 can be mounted to the driven shaft 34e via a press-fit, while the outer race 602 of the second bearing 36e-2 can be mounted to the housing 12e via a press-fit. The bearing balls 604 can be disposed between the inner and outer races 600 and 602 in a conventional manner, and the first and second end seals 606 and 608, which can be formed of an appropriate material, including rubber or nitrile, can be employed to seal the opposite axial ends of the second bearing 36e-2. It will be appreciated that because the second bearing 36e-2 fixes the driven shaft 34e in a given position relative to the housing 12e (i.e., the position of the driven shaft 34e within the second bearing 36e-2 can be controlled or set in an axial direction due to the interference fit between the inner race 600 and the driven shaft 34e), there is no need to fixedly couple the driven shaft 34e to the driving shaft 32e (e.g., via a fastener 100d as in the example of FIG. 18). Consequently, the portion of the driving shaft 34e that extends through the seal 20e can be formed as a generally solid shaft.

Those of skill in the art will appreciate from this disclosure that while the seal 20e can form a primary seal between the driven shaft 34e and the housing 12e, the seal or seals of the second bearing 36e-2 (i.e., the first and second end seals 606 and 608 in the example provided) creates a secondary seal that resists the ingress of coolant into the interior of the clutch assembly 18e. Those of skill in the art will further appreciate that one or both of the first and second end seals 606 and 608 could be omitted, or that the seal 20e could be omitted in the alternative.

Figure 26:
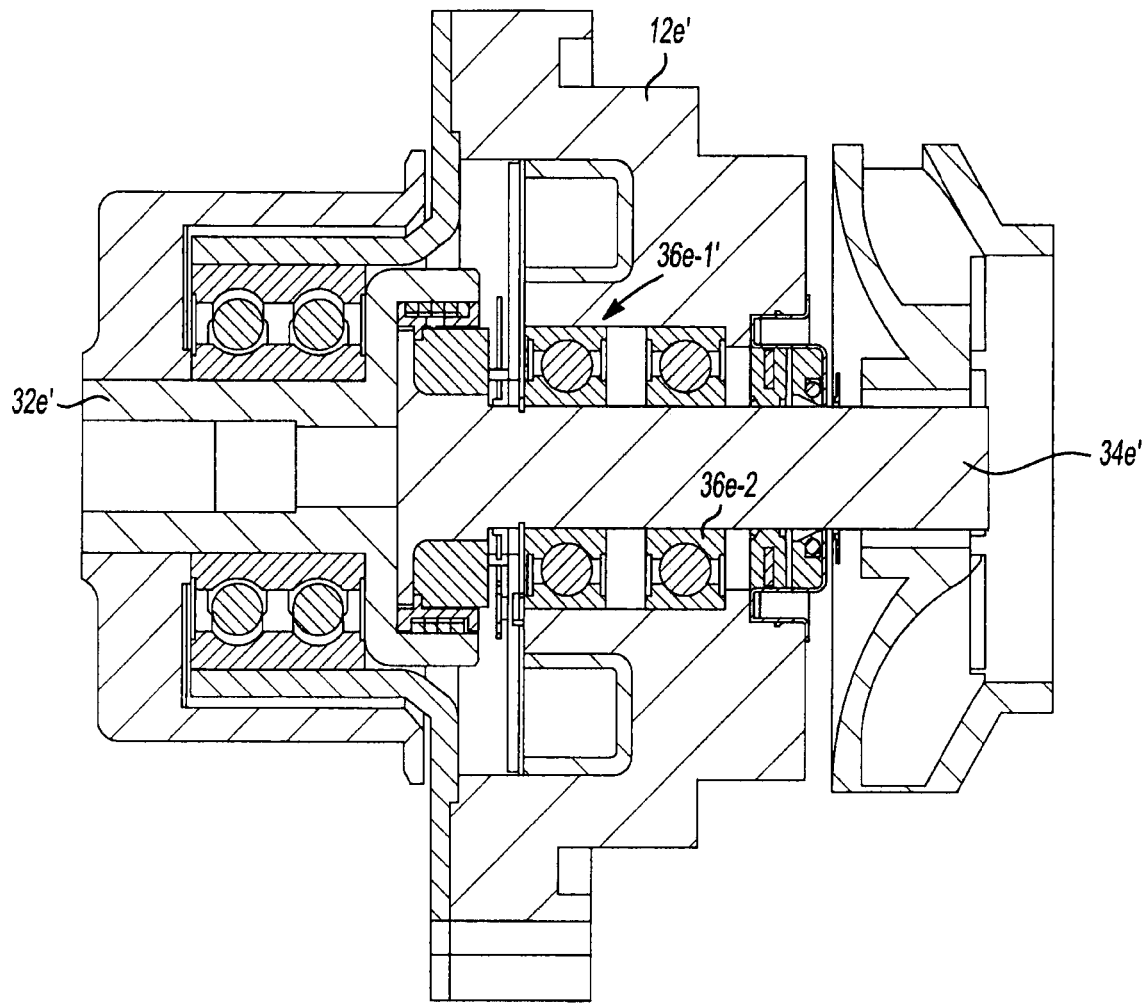
FIG. 26 is a sectional view similar to that of FIG. 25 but depicting an alternate bearing arrangement for supporting the driven shaft relative to the housing.

With reference to FIG. 26, an alternative arrangement is illustrated wherein the first bearing 36e-1' is disposed between the driven shaft 34e' and the housing 12e' to support a first end of the driven shaft 34e'. The first bearing 36e-1' can be any type of bearing, such as a journal bearing, a ball bearing or a needle bearing, and may be sealed or unsealed. Accordingly, those of skill in the art will appreciate from this disclosure that the driven shaft 34e' is supported via the first and second bearings 36e-1' and 36e-2 in a manner that is independent of the driving shaft 32e'.

Figure 27:
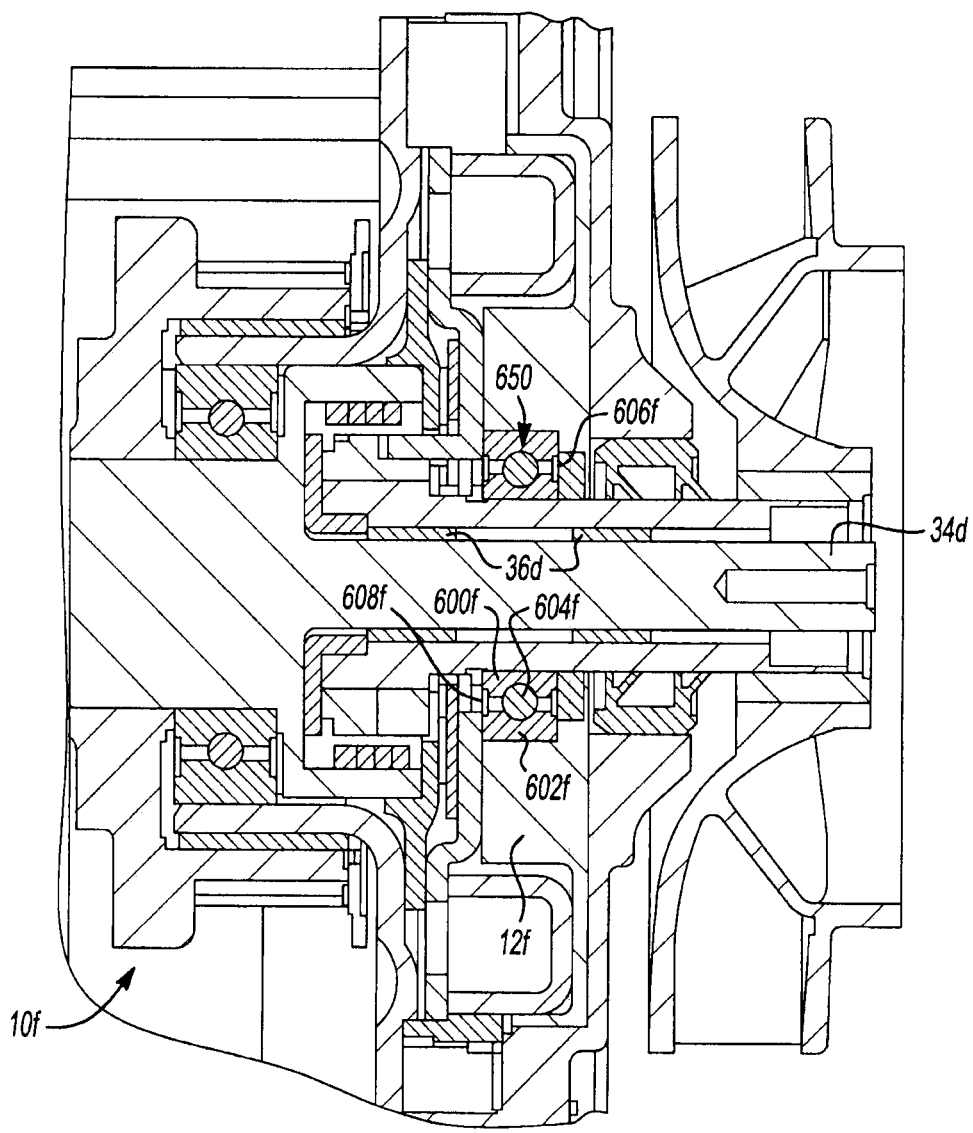
FIG. 27 is a sectional view of a portion of still another driven, clutched component constructed in accordance with the teachings of the present disclosure.

With reference to FIG. 27, another driven, clutched component constructed in accordance with the teachings of the present disclosure is generally indicated by reference numeral 10f. The component 10f can be generally similar to the component 10d shown in FIG. 18, except for the configuration of the driven shaft, its mounting to the housing and its coupling to the driving shaft. In this regard, an auxiliary bearing 650 is employed in addition to the shaft bushings 36d to support the driven shaft 34d for rotation within the housing 12f. In this regard, the auxiliary bearing 650 can have an inner race 600f, which can be press-fit to the driven shaft 34d, an outer race 602f, which can be press-fit to the housing 12f, and a plurality of bearing balls 604f that can be received between the inner and outer races 600f and 602f. If desired, end seals 606f and 608f can be incorporated into one or both axial ends of the auxiliary bearing 650.

With reference to FIG. 26, another driven, clutched component constructed in accordance with the teachings of the present disclosure is generally indicated by reference numeral 10g. The driven, clutched component 10g can be generally similar to the driven, clutched component 10f (FIG. 27) except that that the input portion 64g of the driving shaft 32g can be a hollow structure into which the driven shaft 34g is received, a set of bearings 700 can support the driven shaft 34g for rotation within the input portion 64g, the armature 126g can be biased axially away from the electromagnet 124g via a leaf spring 706 that can be rotatably mounted on the driven shaft 34g, and a bracket 710 can be employed to support the driving shaft 32g relative to the clutch housing 30g. The bracket 710 can be fixed to the clutch housing 30g in any desired manner, such as fasteners (not shown). The bracket 710 can be farmed of a ferromagnetic material or a non-ferromagnetic material and can define a cavity 712 that can receive a bearing 714. The bearing 714 can support the input portion 64g of the driving shaft 32g for rotation relative to the bracket 710. Optionally, an annular guard 716 can be mounted to the power transferring portion 66g of the driving shaft 32g for rotation there with. The annular guard 716 can extend radially inwardly of the helical coils 110 of the wrap spring 38 and can help to form a barrier that is positioned axially between the helical coils 110 and the armature 126g. The barrier can resist axial migration of a lubricant, such as a grease, in a rearward direction. Any or all of the bearings 650, 700 and 714 can be sealed bearings that can resist or inhibit the ingress of dust, moisture and debris into the clutching mechanism, and can resist or inhibit the egress of lubricant from the clutching mechanism.

Figure 28:
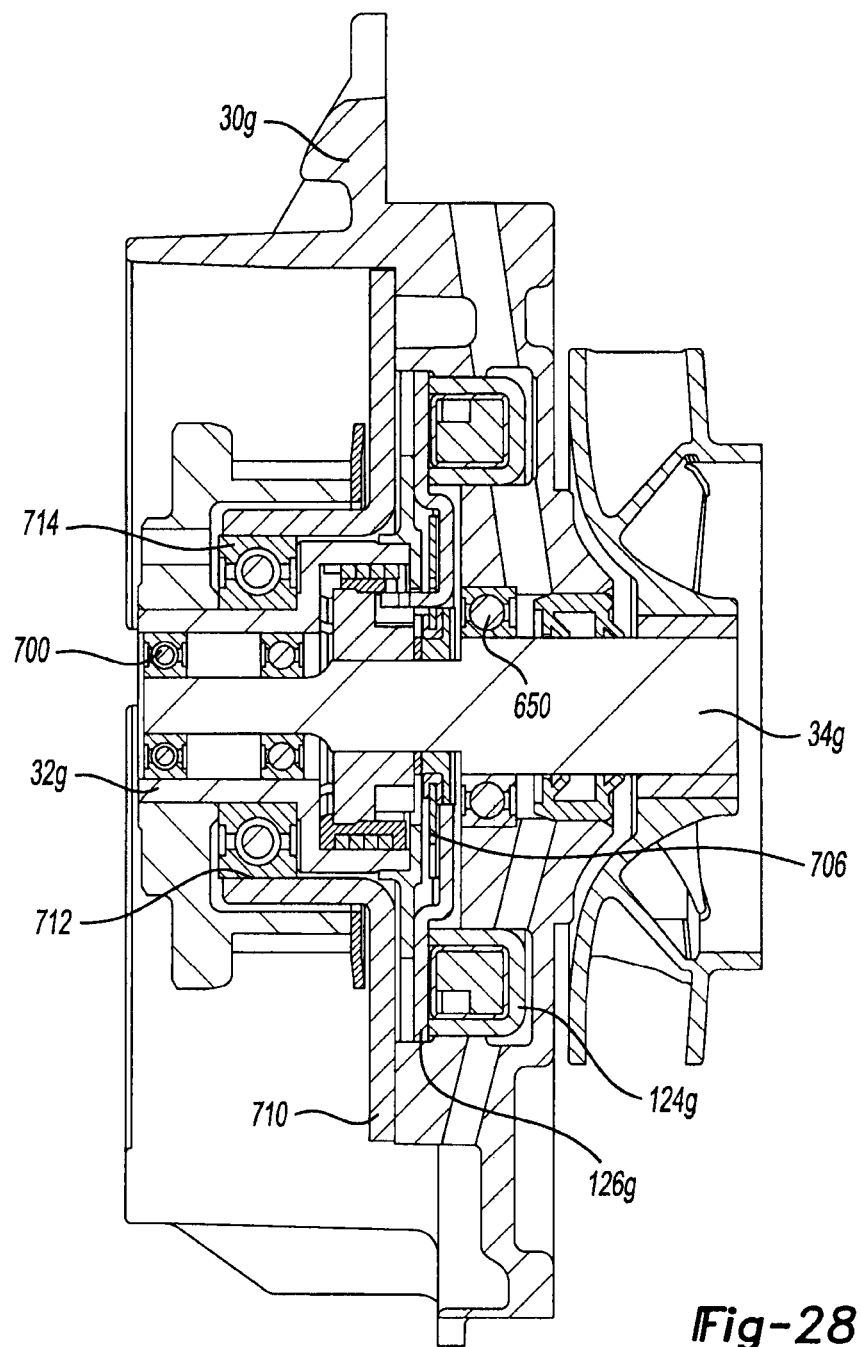
FIG. 28 is a sectional view of another driven, clutched component constructed in accordance with the teachings of the present invention.
Figure 29:
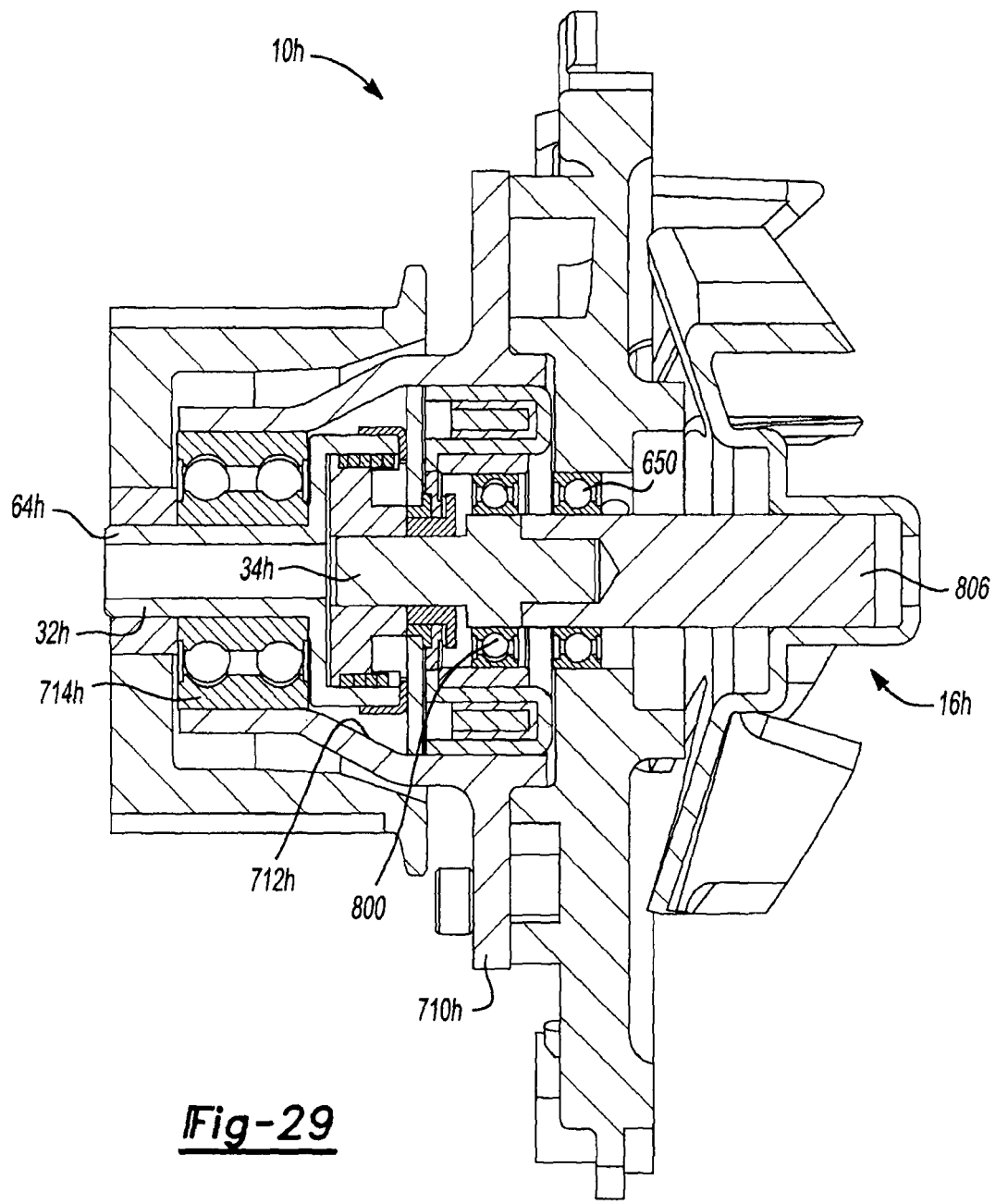
FIG. 29 is a sectional view of still another driven, clutched component constructed in accordance with the teachings of the present invention.

With reference to FIG. 29, another driven, clutched component constructed in accordance with the teachings of the present disclosure is generally indicated by reference numeral 10h. In this example, the clutching mechanism is configured to be assembled into the bracket 710h, which can permit the bracket 710h and clutching mechanism to be assembled to the output member 16h. In the particular example provided, the bracket 710h defines a cavity 712h into which the bearing 714h and the electromagnet 124h are received. The clutching mechanism can be generally similar to that which is shown in FIG. 28, except that the driven shaft 34h is supported for rotation relative to the bracket 710h via a bearing 800 and is non-rotatably coupled to a shaft 806 (e.g., via an interference fit in which one of the driven shaft 34h and the shaft 806 is received into the other one of the driven shaft 34h and the shaft 806) that forms part of the output member 16h. It will be appreciated that tooling, such as a punch, can be inserted through the hollow input portion 64h of the driving shaft 32h to aid in non-rotatably coupling the driven shaft 34h to the shaft 806. In the particular example provided, the bearings 650, 800 and 714h are sealed bearings. It will also be appreciated that while the driven shaft 34h has been described as being non-rotatably coupled to the output member 16h via an interference fit between the driven shaft 34h and the shaft 806, other coupling means could be employed in addition to or in lieu thereof. For example, the coupling means may comprise one or more threaded fasteners that fixedly and non-rotatably couple the driven shaft 34h and the shaft 806.

| Listing of Elements | |
|---|---|
| driven, clutched component | 10 |
| driven, clutched component | 10a |
| driven, clutched component | 10b |
| driven, clutched component | 10c |
| driven, clutched component | 10d |
| driven, clutched component | 10e |
| driven, clutched component | 10f |
| driven, clutched component | 10g |
| driven, clutched component | 10h |
| housing | 12 |
| housing | 12e |
| housing | 12f |
| input member | 14 |
| input member | 14d |
| output member | 16 |
| output member | 16b |
| output member | 16c |
| output member | 16d |
| output member | 16h |
| clutch assembly | 18 |
| clutch assembly | 18a |
| clutch assembly | 18b |
| clutch assembly | 18c |
| clutch assembly | 18d |
| clutch assembly | 18e |
| seal | 20 |
| seal | 20b |
| seal | 20c |
| seal | 20d |
| seal | 20e |
| clutch pocket | 22 |
| clutch housing | 30 |
| clutch housing | 30c |
| clutch housing | 30d |
| clutch housing | 30g |
| driving shaft | 32 |
| driving shaft | 32a |
| driving shaft | 32b |
| driving shaft | 32c |
| driving shaft | 32d |
| driving shaft | 32e |
| driving shaft | 32g |
| driving shaft | 32h |
| driven shaft | 34 |
| driven shaft | 34a |
| driven shaft | 34b |
| driven shaft | 34c |
| driven shaft | 34d |
| driven shaft | 34e |
| driven shaft | 34g |
| driven shaft | 34h |
| shaft bushing | 36 |
| shaft bushing | 36a |
| shaft bushing | 36b |
| shaft bushing | 36c |
| shaft bushing | 36d |
| first bearing | 36e |
| first bearing | 36e-1 |
| first bearing | 36e-1' |
| second bearing | 36e-2 |
| wrap spring | 38 |
| wrap spring | 38a |
| wrap spring | 36b |
| wrap spring | 36c |
| wrap spring | 36d |
| clutch actuator | 40 |
| clutch actuator | 40a |
| clutch actuator | 40b |
| clutch actuator | 40c |
| clutch actuator | 40d |
| end wall | 50 |
| mounting lip | 52 |
| annular side wall | 54 |
| annular side wall | 54d |
| mount | 56 |
| through bore | 58 |
| bore | 58c |
| slotted aperture | 60 |
| input portion | 64 |
| input portion | 64a |
| input portion | 64b |

Listing of Elements

| | |
|---|---|
| input portion | 64c |
| input portion | 64d |
| input portion | 64g |
| input portion | 64h |
| power transferring portion | 66 |
| power transferring portion | 66a |
| power transferring portion | 66b |
| power transferring portion | 66c |
| power transferring portion | 66d |
| power transferring portion | 66g |
| support portion | 68 |
| support portion | 68a |
| support portion | 68b |
| support portion | 68d |
| first annular portion | 70 |
| first annular portion | 70c |
| first annular portion | 70d |
| hollow cylindrical portion | 72 |
| hollow cylindrical portion | 72c |
| hollow cylindrical portion | 72d |
| second annular portion | 74 |
| second annular portion | 74c |
| second annular portion | 74d |
| clutch surface | 78 |
| clutch surface | 78a |
| clutch surface | 78b |
| clutch surface | 78c |
| clutch surface | 78d |
| tubular portion | 82 |
| tubular portion | 82a |
| tubular portion | 82b |
| tubular portion | 82d |
| hub | 83d |
| carrier | 84 |
| carrier | 84a |
| carrier | 84b |
| carrier | 84c |
| carrier | 84d |
| flange | 86 |
| flange | 86a |
| drive tang | 87d |
| helical ramp | 88 |
| helical groove | 88a |
| tang face | 89 |
| tang face | 89a |
| spring slot | 90 |
| spring slot | 90a |
| bushing flange | 94 |
| bushing flange | 94a |
| bushing flange | 94b |
| bushing flange | 94c |
| bushing sleeve | 96 |
| bushing sleeve | 96a |
| bushing sleeve | 96b |
| bushing sleeve | 96c |
| plug | 98 |
| plug | 98a |
| plug | 98d |
| fastener | 100 |
| fastener | 100a |
| fastener | 100d |
| helical coils | 110 |
| helical coils | 110a |
| helical coils | 110b |
| helical coils | 110c |
| helical coils | 110d |
| tang | 112 |
| tang | 112a |
| tang | 112b |
| tang | 112c |
| tang | 112d |
| engagement end | 114 |
| engagement end | 114a |
| engagement end | 114b |
| engagement end | 114c |
| rotational axis | 116 |
| rotational axis | 116a |
| rotational axis | 116b |
| actuator housing | 120 |
| actuator housing | 120a |
| actuator housing | 120b |
| actuator housing | 120c |
| actuator housing | 120d |
| support bearing | 122 |
| support bearing | 122a |
| support bearing | 122b |
| support bearing | 122c |
| support bearing | 122d |
| electromagnet | 124 |
| electromagnet | 124a |
| electromagnet | 124b |
| electromagnet | 124c |
| electromagnet | 124d |
| electromagnet | 124g |
| electromagnet | 124h |
| armature | 126 |
| armature | 126a |
| armature | 126b |
| armature | 126c |
| armature | 126d |
| armature | 126g |
| biasing spring | 128 |
| biasing spring | 128a |
| biasing spring | 128b |
| biasing spring | 128d |
| spring support | 130 |
| spring support | 130a |
| spring support | 130b |
| spring support | 130d |
| annular chamber | 136 |
| annular chamber | 136a |
| annular chamber | 136b |
| annular chamber | 136c |
| annular chamber | 136d |
| annular bearing mount | 140 |
| annular bearing mount | 140a |
| annular bearing mount | 140b |
| annular bearing mount | 140c |
| annular bearing mount | 140d |
| housing mount | 142 |
| housing mount | 142a |
| housing mount | 142b |
| housing mount | 142c |
| housing mount | 142d |
| outer bearing race | 144 |
| outer bearing race | 144a |
| outer bearing race | 144b |
| outer bearing race | 144c |
| outer bearing race | 144d |
| lead wires | 150 |
| lead wires | 150a |
| lead wires | 150b |
| lead wires | 150c |
| lead wires | 150d |
| armature plate | 154 |
| armature plate | 154a |
| armature plate | 154b |
| armature plate | 154c |
| armature plate | 154d |
| spring holding ring | 156 |
| spring stop | 156d |
| armature member | 158 |
| armature member | 158a |
| armature member | 158b |
| armature member | 158c |
| retainer | 160 |
| retainer | 160a |
| retainer | 160b |
| friction surface | 162 |
| friction surface | 162a |
| friction surface | 162b |
| friction surface | 162c |
| friction surface | 162d |
| tubular portion | 166 |

-continued

| Listing of Elements | |
|---|---|
| tubular portion | 166a |
| tubular portion | 166b |
| tubular portion | 166d |
| end stop | 168 |
| end stop | 168a |
| end stop | 168d |
| tang slot | 170 |
| tang slot | 170a |
| tang slot | 170b |
| tang slot | 170d |
| annular shoulder | 174 |
| armature bushing | 200 |
| necked down portion | 220 |
| shoulder | 222 |
| coupling recess | 300 |
| threaded fastener | 306 |
| hub portion | 330 |
| step | 400 |
| armature sleeve | 410 |
| tubular portion | 412 |
| flange member | 414 |
| body | 500 |
| radial end wall | 502 |
| abutting surface | 502a |
| radial end wall | 504 |
| abutting surface | 504a |
| axial end face | 510 |
| slot | 512 |
| slot | 520 |
| hub cap | 530 |
| decoupling tab | 532 |
| tab face | 534 |
| arm | 550 |
| spring body | 552 |
| inner race | 600 |
| outer race | 602 |
| bearing balls | 604 |
| first end seal | 606 |
| second end seal | 608 |
| necked down portion | 612 |
| pocket | 614 |
| auxiliary bearing | 650 |
| bearings | 700 |
| leaf spring | 706 |
| bracket | 710 |
| bracket | 701h |
| cavity | 712 |
| cavity | 712h |
| bearing | 714 |
| bearing | 714h |
| annular guard | 716 |
| bearing | 800 |
| shaft | 806 |

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A component comprising:
    a clutch assembly with a driving member, a driven member, a wrap spring and an actuator, the driving member having a clutch surface and being configured to be coupled to a source of rotary power, the wrap spring comprising a plurality of helical coils, a tang and an engaging portion, at least a portion of the helical coils being engaged to the clutch surface, the tang extending from a first axial end of the wrap spring, the engaging portion being disposed on a second, opposite axial end of the wrap spring, the engaging portion extending over an arc that is less than 360 degrees, the actuator having an electromagnet, which is mounted coaxially about the driving member, and an armature that is axially movable between a first position and a second position, wherein the driven member includes a carrier to which the engaging portion of the wrap spring is rotatably coupled;
    wherein the wrap spring is configured to transmit rotary power between the driving member and the driven member when the electromagnet is not operated and the armature is in the first position;
    wherein the driving member is a shaft having an input portion, which is adapted to receive rotary power, and a power transferring portion, the power transferring portion defining the clutch surface; and
    wherein the clutch assembly further comprises an actuator housing and a bearing assembly, the electromagnet being mounted on the actuator housing, the bearing assembly being mounted to the actuator housing and the input portion and being the sole means for supporting the driving member for rotation relative to the actuator housing, the bearing assembly being disposed at a location that is spaced apart from the power transferring portion axially along a rotational axis of the driving member.

2. The component of claim 1, wherein the at least the portion of the helical coils is configured to grip the clutch surface on their outer circumferential surface.

3. The component of claim 1, wherein the driving member includes a support portion and a bushing is disposed between the driven member and the support portion.

4. The component of claim 1, wherein the at least the portion of the helical coils is configured to grip the clutch surface on their inner circumferential surface.

5. The component of claim 1, wherein the armature frictionally engages the actuator housing when the armature is in the second position.

6. The component of claim 1, wherein the helical coils of the wrap spring are less than 15 mm in diameter.

7. The component of claim 1, wherein the carrier is rotatable relative to the power transferring portion through a predetermined angle.

8. The component of claim 7, wherein the power transferring portion comprises a hub that is fixed to the input portion for common rotation and wherein the carrier is mounted to the hub.

9. The component of claim 1, wherein the bearing assembly comprises a plurality of rows of bearing elements.

10. The component of claim 9, wherein the bearing assembly is a double-row bearing.

11. The component of claim 10, wherein the bearing elements are bearing balls.

12. A component comprising:

a clutch assembly with a housing, a driving shaft, a first bearing, a wrap spring, an electromagnet, an armature, a driven member and a second bearing, the driving shaft having an input portion, a support portion and a power transferring portion located axially between the input portion and the support portion, the input portion being configured to be coupled to a source of rotary power, the first bearing being mounted to the housing and the input portion to support the driving shaft for rotation about a rotational axis, the power transferring portion extending from the input portion such that the power transferring portion and the support portion are cantilevered, the power transferring portion having a clutch surface, the wrap spring comprising a plurality of helical coils, a tang and an engaging portion, at least a portion of the helical coils being engaged to the clutch surface, the tang extending from a first axial end of the wrap spring, the engaging portion being disposed on a second, opposite axial end of the wrap spring, the engaging portion extending over an arc that is less than 360 degrees, the electromagnet being coupled to the housing coaxially about the driving member, the armature being axially movable between a first position and a second position, the driven member comprising a carrier to which the engaging portion of the wrap spring is rotatably coupled, the second bearing being mounted to the support portion and the driven member such that the driven member is supported by the second bearing for rotation on the support portion;

wherein the wrap spring is configured to transmit rotary power between the driving shaft and the driven member when the electromagnet is not operated and the armature is in the first position.

13. The component of claim 12, wherein the clutch surface is an internal surface into which the wrap spring is received.

14. The component of claim 12, wherein the clutch surface is an external surface over which the wrap spring is received.

15. The component of claim 12, wherein the armature frictionally engages the actuator housing when the armature is in the second position.

16. The component of claim 12, wherein the helical coils of the wrap spring are less than 15 mm in diameter.

17. The component of claim 1, wherein the carrier is rotatable relative to the power transferring portion through a predetermined angle.

18. The component of claim 17, wherein the power transferring portion comprises a hub that is fixed to the input portion for common rotation and wherein the carrier is mounted to the hub.

19. The component of claim 12, wherein the first bearing comprises a plurality of rows of bearing elements.

20. The component of claim 19, wherein the first bearing is a double-row bearing.

21. The component of claim 20, wherein the bearing elements are bearing balls.

* * * * *